(12) United States Patent
Viljoen et al.

(10) Patent No.: US 10,250,528 B2
(45) Date of Patent: *Apr. 2, 2019

(54) PACKET PREDICTION IN A MULTI-PROTOCOL LABEL SWITCHING NETWORK USING OPERATION, ADMINISTRATION, AND MAINTENANCE (OAM) MESSAGING

(71) Applicant: Netronome Systems, Inc., Santa Clara, CA (US)

(72) Inventors: Nicolaas J. Viljoen, Cambridge (GB); Sandra Scott-Hayward, Belfast (GB)

(73) Assignee: Netronome Systems, Inc., Santa Clara, CA (US)

( * ) Notice: Subject to any disclaimer, the term of this patent is extended or adjusted under 35 U.S.C. 154(b) by 478 days.

This patent is subject to a terminal disclaimer.

(21) Appl. No.: 14/264,003

(22) Filed: Apr. 28, 2014

(65) Prior Publication Data

US 2014/0236873 A1 Aug. 21, 2014

Related U.S. Application Data

(63) Continuation-in-part of application No. 13/675,453, filed on Nov. 13, 2012, now Pat. No. 9,344,384.

(51) Int. Cl.
*G06F 15/173* (2006.01)
*H04L 12/931* (2013.01)
(Continued)

(52) U.S. Cl.
CPC .......... *H04L 49/602* (2013.01); *H04L 41/147* (2013.01); *H04L 45/08* (2013.01);
(Continued)

(58) Field of Classification Search
CPC ..... H04L 45/38; H04L 45/00; H04L 47/2441; H04L 47/10
See application file for complete search history.

(56) References Cited

U.S. PATENT DOCUMENTS

| 6,424,659 B2 * | 7/2002 | Viswanadham | ...... H04L 49/602 370/389 |
| 6,574,240 B1 * | 6/2003 | Tzeng | ................... H04L 49/602 370/392 |

(Continued)

*Primary Examiner* — Hamza N Algibhah
*Assistant Examiner* — Tesfu N Mekonen
(74) *Attorney, Agent, or Firm* — Imperium Patent Works LLP; T. Lester Wallace; Andrew C. Palmer

(57) ABSTRACT

A first switch in a MPLS network receives a plurality of packets that are part of a pair of flows. The first switch performs a packet prediction learning algorithm on the first plurality of packets and generates packet prediction information that is communicated to a second switch within the MPLS network utilizing an Operations, Administration, and Maintenance (OAM) packet (message). In a first example, the first switch communicates a packet prediction information notification to a Network Operations Center (NOC) that in response communicates a packet prediction control signal to the second switch. In a second example, the first switch does not communicate a packet prediction information notification. In the first example, the second switch utilizes the packet prediction control signal to determine if the packet prediction information is to be utilized. In the second example, second switch independently determines if the packet prediction information is to be used.

19 Claims, 17 Drawing Sheets

EXEMPLARY SYSTEM INVOLVING AN
MPLS NETWORK

(51) Int. Cl.
*H04L 12/751* (2013.01)
*H04L 12/715* (2013.01)
*H04L 12/723* (2013.01)
*H04L 12/773* (2013.01)
*H04L 12/24* (2006.01)
*H04L 12/26* (2006.01)

(52) U.S. Cl.
CPC .............. H04L 45/50 (2013.01); H04L 45/60 (2013.01); H04L 45/64 (2013.01); *H04L 43/028* (2013.01)

(56) References Cited

U.S. PATENT DOCUMENTS

| | | | | |
|---|---|---|---|---|
| 7,415,531 B2* | 8/2008 | Musoll | ................... | H04L 45/00 709/238 |
| 7,551,603 B1* | 6/2009 | Shaffer | ............... | H04L 12/5693 370/252 |
| 7,633,943 B2* | 12/2009 | MeLampy | ........ | H04L 29/06027 370/392 |
| 7,706,271 B2* | 4/2010 | Wakayama | ............. | H04L 29/06 370/235 |
| 8,077,734 B2* | 12/2011 | Musoll | .................... | H04L 45/00 370/230 |
| 8,897,134 B2* | 11/2014 | Kern | ....................... | H04L 45/02 370/235 |
| 8,964,563 B2* | 2/2015 | Jocha | .................... | H04L 43/026 370/235 |
| 2005/0030898 A1* | 2/2005 | Furlong | .................. | H04L 12/24 370/236 |
| 2007/0223391 A1* | 9/2007 | Kuroki | .................. | H04J 3/0632 370/252 |
| 2011/0289578 A1* | 11/2011 | Bugenhagen | ........... | H04L 12/14 726/11 |
| 2013/0176850 A1* | 7/2013 | Mishra | .................... | H04L 49/00 370/235 |

* cited by examiner

EXEMPLARY SYSTEM INVOLVING AN
MPLS NETWORK

MPLS DATA PACKET

MPLS SWITCH WITH PACKET
PREDICTION CAPABILITY

MPLS NETWORK UTILIZING OPENFLOW MESSAGING TO COMMUNICATE PACKET PREDICTION INFORMATION AND PACKET PREDICTION ENABLE SIGNALS

MPLS NETWORK UTILIZING OPENFLOW MESSAGING TO COMMUNICATE PACKET PREDICTION INFORMATION

PACKET PREDICTION MANAGEMENT OF MPLS SWITCHES UTILIZING OAM
PACKETS TO COMMUNICATE PACKET PREDICTION INFORMATION

| MPLS LABEL OF RX PACKET OR IP SRC/IP DEST OF RX PACKET | MPLS LABEL FOR TX PACKET | OUTPUT PORT | PRIMARY PATH/ SECONDARY PATH | RULE (REP/ PSH/ POP) |
|---|---|---|---|---|
|  |  |  |  |  |
| IP SRC OF S1, IP DEST OF S9 | LBL2-8 (FOR PATH S2 TO S8) | 1 | P | REP |
| IP SRC OF S1, IP DEST OF S9 | LBL2-3 (FOR PATH S2 TO S3) | 2 | S | REP |
|  |  |  |  |  |
|  |  |  |  |  |

TWO ENTRIES FOR ONE "PAIR OF FLOWS"

FLOW TABLE FOR S2

FIG. 11

| MPLS LABEL OF RX PACKET OR IP SRC/IP DEST OF RX PACKET | MPLS LABEL FOR TX PACKET | OUTPUT PORT | PRIMARY PATH/ SECONDARY PATH | RULE (REP/ PSH/ POP) |
|---|---|---|---|---|
|  |  |  |  |  |
| LBL2-8 | LBL8-5 (FOR PATH S8 TO S5) | 1 | P | REP |
| LBL2-8 | LBL8-7 (FOR PATH S8 TO S7) | 2 | S | REP |
|  |  |  |  |  |

TWO ENTRIES FOR ONE "PAIR OF FLOWS"

FLOW TABLE FOR S8

FIG. 12

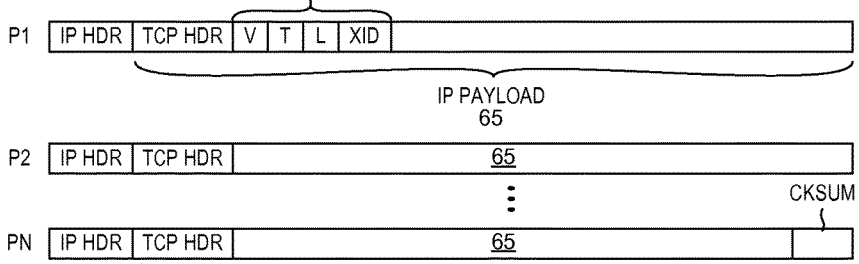

OPENFLOW MESSAGE FOR ADDING AN OAM SESSION TABLE TO A SWITCH

FIG. 13

OPENFLOW PLUG-AND-PLAY BOOT LOAD MESSAGE

| PSS (PACKET N-1) | PSS (PACKET N) | PSST #1 → #2 | PSST #2 → #3 | PSST #3 → #4 | PSST #4 → #5 | PSST #5 → #6 | PSST #6 → #7 |
|---|---|---|---|---|---|---|---|
| 1 | 1 | MLAP, % | MLAP, % | MLAP, % | MLAP, % | MLAP, % | MLAP, % |
| | 2 | MLAP, % | MLAP, % | MLAP, % | MLAP, % | MLAP, % | MLAP, % |
| | 3 | MLAP, % | MLAP, % | MLAP, % | MLAP, % | MLAP, % | MLAP, % |
| | 4 | MLAP, % | MLAP, % | MLAP, % | MLAP, % | MLAP, % | MLAP, % |
| | 5 | MLAP, % | MLAP, % | MLAP, % | MLAP, % | MLAP, % | MLAP, % |
| | 6 | MLAP, % | MLAP, % | MLAP, % | MLAP, % | MLAP, % | MLAP, % |
| 2 | 1 | MLAP, % | MLAP, % | MLAP, % | MLAP, % | MLAP, % | MLAP, % |
| | 2 | MLAP, % | MLAP, % | MLAP, % | MLAP, % | MLAP, % | MLAP, % |
| | 3 | MLAP, % | MLAP, % | MLAP, % | MLAP, % | MLAP, % | MLAP, % |
| | 4 | MLAP, % | MLAP, % | MLAP, % | MLAP, % | MLAP, % | MLAP, % |
| | 5 | MLAP, % | MLAP, % | MLAP, % | MLAP, % | MLAP, % | MLAP, % |
| | 6 | MLAP, % | MLAP, % | MLAP, % | MLAP, % | MLAP, % | MLAP, % |
| 3 | 1 | MLAP, % | MLAP, % | MLAP, % | MLAP, % | MLAP, % | MLAP, % |
| | 2 | MLAP, % | MLAP, % | MLAP, % | MLAP, % | MLAP, % | MLAP, % |
| | 3 | MLAP, % | MLAP, % | MLAP, % | MLAP, % | MLAP, % | MLAP, % |
| | 4 | MLAP, % | MLAP, % | MLAP, % | MLAP, % | MLAP, % | MLAP, % |
| | 5 | MLAP, % | MLAP, % | MLAP, % | MLAP, % | MLAP, % | MLAP, % |
| | 6 | MLAP, % | MLAP, % | MLAP, % | MLAP, % | MLAP, % | MLAP, % |
| 4 | 1 | MLAP, % | MLAP, % | MLAP, % | MLAP, % | MLAP, % | MLAP, % |
| | 2 | MLAP, % | MLAP, % | MLAP, % | MLAP, % | MLAP, % | MLAP, % |
| | 3 | MLAP, % | MLAP, % | MLAP, % | MLAP, % | MLAP, % | MLAP, % |
| | 4 | MLAP, % | MLAP, % | MLAP, % | MLAP, % | MLAP, % | MLAP, % |
| | 5 | MLAP, % | MLAP, % | MLAP, % | MLAP, % | MLAP, % | MLAP, % |
| | 6 | MLAP, % | MLAP, % | MLAP, % | MLAP, % | MLAP, % | MLAP, % |
| 5 | 1 | MLAP, % | MLAP, % | MLAP, % | MLAP, % | MLAP, % | MLAP, % |
| | 2 | MLAP, % | MLAP, % | MLAP, % | MLAP, % | MLAP, % | MLAP, % |
| | 3 | MLAP, % | MLAP, % | MLAP, % | MLAP, % | MLAP, % | MLAP, % |
| | 4 | MLAP, % | MLAP, % | MLAP, % | MLAP, % | MLAP, % | MLAP, % |
| | 5 | MLAP, % | MLAP, % | MLAP, % | MLAP, % | MLAP, % | MLAP, % |
| | 6 | MLAP, % | MLAP, % | MLAP, % | MLAP, % | MLAP, % | MLAP, % |
| 6 | 1 | MLAP, % | MLAP, % | MLAP, % | MLAP, % | MLAP, % | MLAP, % |
| | 2 | MLAP, % | MLAP, % | MLAP, % | MLAP, % | MLAP, % | MLAP, % |
| | 3 | MLAP, % | MLAP, % | MLAP, % | MLAP, % | MLAP, % | MLAP, % |
| | 4 | MLAP, % | MLAP, % | MLAP, % | MLAP, % | MLAP, % | MLAP, % |
| | 5 | MLAP, % | MLAP, % | MLAP, % | MLAP, % | MLAP, % | MLAP, % |
| | 6 | MLAP, % | MLAP, % | MLAP, % | MLAP, % | MLAP, % | MLAP, % |

MLAP = MOST LIKELY APPLICATION PROTOCOL.
% = PROBABILITY THAT THE PACKET N IS THE MOST LIKELY APPLICATION PROTOCOL.

APPLICATION PROTOCOL ESTIMATION TABLE

FIG. 21

APPLICATION PROTOCOL = HTML (A SEPARATE TABLE IS GENERATED FOR EACH PROTOCOL)

| IPIS (PACKET N) | IPIS (PACKET N+1) | INTER-PACKET INTERVAL STATE TRANSITION (IPIST) PACKET (N-1) TO PACKET (N) | | | | | | |
|---|---|---|---|---|---|---|---|---|
| | | 8→9 | 9→10 | 10→11 | ... | 47→48 | 48→49 | 49→50 |
| EXAMPLE A — 1 | 1 | 10 | # | # | ... | # | # | # |
| | 2 | 15 | # | # | ... | # | # | # |
| | 3 | 20 | # | # | ... | # | # | # |
| | 4 | 30 | # | # | ... | # | # | # |
| | 5 | 15 | # | # | ... | # | # | # |
| | 6 | 25 | # | # | ... | # | # | # |
| 2 | 1 | # | # | # | ... | # | # | # |
| | 2 | # | # | # | ... | # | # | # |
| | 3 | # | # | # | ... | # | # | # |
| | 4 | # | # | # | ... | # | # | # |
| | 5 | # | # | # | ... | # | # | # |
| | 6 | # | # | # | ... | # | # | # |
| 3 | 1 | # | # | # | ... | # | # | # |
| | 2 | # | # | # | ... | # | # | # |
| | 3 | # | # | # | ... | # | # | # |
| | 4 | # | # | # | ... | # | # | # |
| | 5 | # | # | # | ... | # | # | # |
| | 6 | # | # | # | ... | # | # | # |
| EXAMPLE B — 4 | 1 | # | # | # | ... | 90 | # | # |
| | 2 | # | # | # | ... | 20 | # | # |
| | 3 | # | # | # | ... | 600 | # | # |
| | 4 | # | # | # | ... | 10 | # | # |
| | 5 | # | # | # | ... | 50 | # | # |
| | 6 | # | # | # | ... | 78 | # | # |
| 5 | 1 | # | # | # | ... | # | # | # |
| | 2 | # | # | # | ... | # | # | # |
| | 3 | # | # | # | ... | # | # | # |
| | 4 | # | # | # | ... | # | # | # |
| | 5 | # | # | # | ... | # | # | # |
| | 6 | # | # | # | ... | # | # | # |
| 6 | 1 | # | # | # | ... | # | # | # |
| | 2 | # | # | # | ... | # | # | # |
| | 3 | # | # | # | ... | # | # | # |
| | 4 | # | # | # | ... | # | # | # |
| | 5 | # | # | # | ... | # | # | # |
| | 6 | # | # | # | ... | # | # | # |

\# = PATH COUNT (TOTAL NUMBER OF STATE TRANSITIONS THAT FOLLOW THE N TO N+1 INTER-PACKET INTERVAL STATE PATH.

INTER-PACKET INTERVAL PREDICTION TABLE

PACKET PREDICTION IN A MULTI-PROTOCOL LABEL SWITCHING NETWORK USING OPERATION, ADMINISTRATION, AND MAINTENANCE (OAM) MESSAGING

CROSS REFERENCE TO RELATED APPLICATION

This application is a continuation-in-part of, and claims priority under 35 U.S.C. § 120 from, nonprovisional U.S. patent application Ser. No. 13/675,453 entitled "INTER-PACKET INTERVAL PREDICTION OPERATING ALGORITHM," by Nicolaas J. Viljoen, Niel Viljoen, and Gavin Stark, filed on Nov. 13, 2012, now issued as U.S. Pat. No. 9,344,384. The disclosure of the foregoing document is incorporated herein by reference.

TECHNICAL FIELD

The described embodiments relate generally to Multi-Protocol Label Switching (MPLS) networks. More specifically, the embodiments relate to utilizing packet prediction methodologies in an MPLS network.

BACKGROUND INFORMATION

MPLS (Multi-Protocol Label Switching) did not originally provide provisions for OAM (Operation, Administration and Maintenance) monitoring of segments in an MPLS network. A type of MPLS for transport networks, referred to as MPLS-TP (MPLS Transport Profile), is now under development by the IETF (Internet Engineering Task Force). MPLS-TP includes OAM features and tools. Certain IETF documents, such as RFC 5860, RFC 5921, and RFC 5960, set forth requirements of OAM in proposed MPLS-TP networks. In such a proposed MPLS-TP network, a device referred to as a NOC (Network Operation Center) is generally employed to configure and to setup network switches. Switches included in the MPLS network store a flow table that instruct the switch as to how incoming packets are to be routed through the MPLS network. A high speed local memory (known as cache memory) in the switch may not be large enough to store flow entries for each flow of packets that are routed by the switch. The entire flow table is therefore stored in a lower speed (larger capacity) memory on the switch and only a subset of flow entries are read from the lower speed memory and stored in the high speed local memory at a given moment in time. The bandwidth of the switch is reduced when the switch is required to read flow entries from lower speed memory and store the flow entries in the high speed local memory before routing a packet.

SUMMARY

In a first novel aspect, a first switch in a MPLS network receives a plurality of packets. The plurality of packets are part of a pair of flows. The first switch performs a packet prediction learning algorithm on the first plurality of packets and generates packet prediction information. The first switch communicates the packet prediction information to a Network Operation Center (NOC). In response, the NOC communicates the packet prediction information to a second switch within the MPLS network utilizing OpenFlow messaging. In a first example, the NOC communicates a packet prediction control signal to the second switch. In a second example, a packet prediction control signal is not communicated. In the first example, based on the packet prediction control signal, the second switch determines if it will utilize the packet prediction information. In the second example, the second switch independently determines if the packet prediction information is to be used.

In one example, the communication between the first switch and the NOC and the communication between the NOC and the second switch are accomplished utilizing OpenFlow messaging. The packet prediction information is included in the payload portion of the OpenFlow message. The packet prediction information includes Inter-Packet Interval (IPI) information for a specific application protocol or application protocol estimation table. The plurality of packets are part of a pair of flows and the plurality of packets belong to the same application protocol. When the packet prediction control signal is a first value the second switch performs the packet prediction operation, and when the packet prediction control signal is a second value the second switch does not perform the packet prediction operation. The plurality of application protocols for which the second switch performs packet prediction is a function of the packet prediction control signal.

In another example, prediction learning algorithm configuration information is communicated from the NOC to the first switch via OpenFlow messaging. The prediction learning algorithm configuration information configures the prediction learning algorithm characteristics. The number of packets included in the plurality of packets is a function of the prediction learning algorithm configuration information, and the number of inter-packet intervals generated for an application protocol is a function of the prediction learning algorithm configuration information.

In a second novel aspect, a first switch in a MPLS network receives a plurality of packets that are part of a pair of flows. The first switch performs a packet prediction learning algorithm on the first plurality of packets and generates packet prediction information that is communicated to a second switch within the MPLS network utilizing an Operations, Administration, and Maintenance (OAM) message. In a first example, the first switch communicates a packet prediction information notification to a Network Operations Center (NOC) that in response communicates a packet prediction control signal to the second switch. In a second example, the first switch does not communicate a packet prediction information notification. In the first example, the second switch utilizes the packet prediction control signal to determine if the packet prediction information is to be utilized. In the second example, second switch independently determines if the packet prediction information is to be used.

In one example, the communication between the first switch and the NOC is accomplished utilizing OpenFlow messaging and the communication between the first switch and the second switch is accomplished utilizing Operations, Administration, and Maintenance (OAM) messaging. The packet prediction information is included in a payload portion of the OAM message. The packet prediction control signal is included in a payload portion of an OpenFlow message. The packet prediction information includes Inter-Packet Interval (IPI) information for a specific application protocol or the application protocol estimation table. The plurality of packets are part of a pair of flows, and wherein the plurality of packets belong to the same application protocol. When the packet prediction control signal is a first value the second switch performs the packet prediction operation, and when the packet prediction control signal is a second value the second switch does not perform the packet prediction. The plurality of application protocols for which the second switch performs packet prediction algorithm is a function of the packet prediction control signal.

In another example, prediction learning algorithm configuration information is communicated from the NOC to the first switch via OpenFlow messaging. The prediction learning algorithm configuration information configures the prediction learning algorithm characteristics. The number of packets included in the plurality of packets is a function of the prediction learning algorithm configuration information, and the number of inter-packet intervals generated for an application protocol is a function of the prediction learning algorithm configuration information.

Further details and embodiments and techniques are described in the detailed description below. This summary does not purport to define the invention. The invention is defined by the claims

BRIEF DESCRIPTION OF THE DRAWINGS

The accompanying drawings, where like numerals indicate like components, illustrate embodiments of the invention.

FIG. 11 is a diagram of the flow table in switch S2 of the MPLS network of FIG. 1.

FIG. 12 is a diagram of the flow table in switch S8 of the MPLS network of FIG. 1.

FIG. 13 is an OpenFlow message for adding OAM session information into a switch of the MPLS network of FIG. 1.

FIG. 21 is a diagram that illustrates an example of an application protocol estimation table.

FIG. 22 is a diagram that illustrates an example of an inter-packet interval prediction table.

DETAILED DESCRIPTION

Reference will now be made in detail to some embodiments of the invention, examples of which are illustrated in the accompanying drawings.

Figure 1:
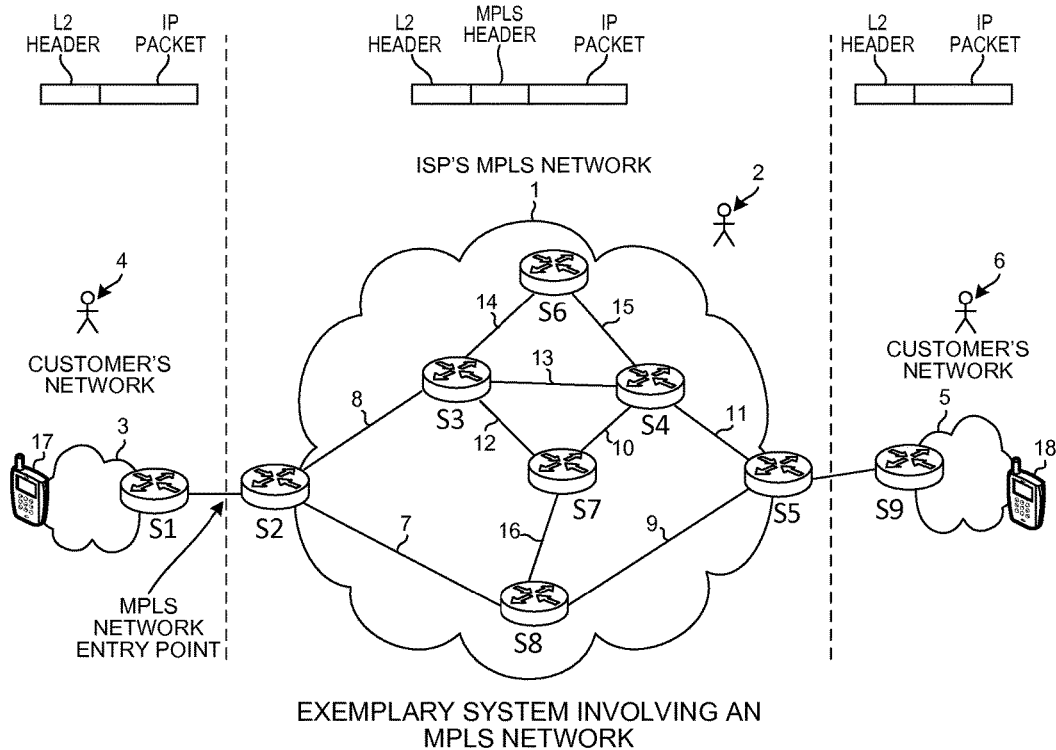
FIG. 1 is a diagram of the MPLS network.

MPLS-TP is a type of MPLS, so network 1 is hereafter in this document referred to as MPLS network. FIG. 1 is a diagram of the MPLS network 1 and two customer networks 3 and 5. MPLS network 1 is managed by and operated by and is most likely owned by a first entity 2. The first entity may, for example, be a corporate entity called an "Internet Service Provider" that provides networking communication services to customers. The first entity 2 is represented in FIG. 1 by a stick figure of a person. In a first step, the MPLS network 1 is operational and is communicating packets using MPLS labels, but the MPLS network 1 is not yet communicating packets of a particular flow. Moreover, the various segments between switches in the MPLS network 1 are being monitored by OAM sessions. Reference numerals 7-16 identify these segments. Generally, there is an OAM session operating across each one of the segments. There also may be an OAM session that extends across and bridges multiple end-to-end segments.

In one example a flow of IP packets that originate from an IP source address in switch S1 of customer network 3 of a second entity 4. The second entity 4 is also represented in FIG. 1 by a stick figure of a person. This second entity is in one example a corporate entity that provides networking services to an individual user of a network device such as the cellular telephone 17 pictured in FIG. 1. The flow of packets is to traverse the MPLS network 1, and is to arrive at a destination IP address in switch S9 of customer network 5 of a third entity. The third entity 6 is also represented in FIG. 1 by a stick figure of a person. Although in the example being illustrated the networks 3 and 5 are different networks and are operated by different customer entities, in other examples the networks 3 and 5 are actually different parts of the same network of the same customer entity. The characteristic that is important for the example being described is that the packets of the flow on their way from the IP source to the IP destination pass into, through, and then out of the MPLS network 1.

Figure 2:
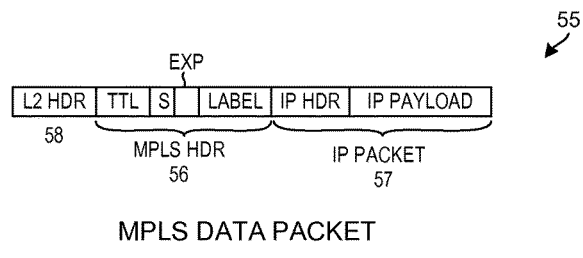
FIG. 2 is a diagram of an MPLS data packet.

In the present example, the flow of packets carries voice data for a call between cellular telephone 17 and cellular telephone 18. The first entity 2 in this sense contracts with the customer entity 4 to provide long haul transport for the packets across MPLS network 1 in return for a fee. In accordance with the MPLS protocol, packets entering the MPLS network receive an MPLS label and are said to be encapsulated. The MPLS network then uses the MPLS label to direct the packets through the switches S2-S5 to an edge router on an opposite edge of the network. The underlying packet that is encapsulated may be an IP packet, but the header of the underlying packet is not used by the MPLS network for switching, rather MPLS labels are used to switch packets across the MPLS network. FIG. 2 is a diagram of an MPLS data packet 55 that is an L2 frame such as an Ethernet frame. Reference numeral 56 identifies the MPLS header. Packet 55 also includes an IP packet 57. The MPLS header 56 and the IP packet 57 together form the payload of the packet 55. The L2 header of the packet 55 is identified by reference numeral 58.

When the encapsulated IP packet reaches the last MPLS switch at the opposite edge of the MPLS network, its MPLS label is removed from the underlying IP packet, and the IP packet is sent on its way to its IP destination address. Communication of the IP packet through the MPLS network is transparent to the sender of the IP packet that sent the IP packet into the MPLS network. Communication of the IP packet through the MPLS network is also transparent to the receiver of the IP packet on the other side of the MPLS network. In the illustration of FIG. 1, how the telephone call voice data traverses customer network 3 from cellular telephone 17 to switch S1 is not shown, and how the telephone call voice data traverses customer network 5 from switch S9 to cellular telephone 18 is not shown. In other examples, the IP source address of the packets is in telephone 17 and/or the IP destination address of the packets is in telephone 18.

Figure 3:
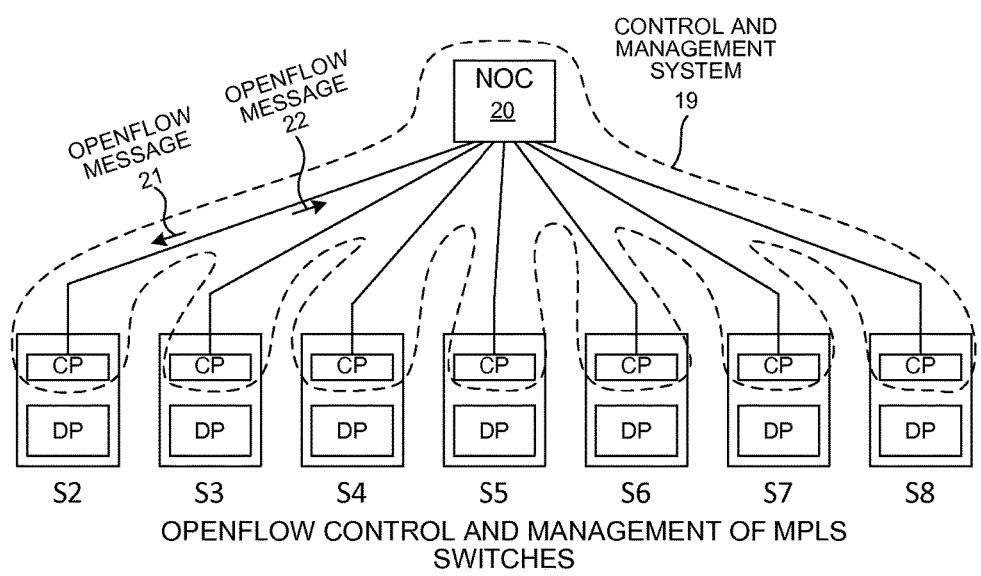
FIG. 3 is a diagram of an OpenFlow control and management part of the MPLS network of FIG. 1.

FIG. 3 is a diagram of a control and management system 19 of the MPLS network. Each of the switches S2-S8 of the MPLS network 1 includes a control plane portion CP and a data plane portion DP. A central functionality 20 referred to as a NOC (Network Operation Center) is in network communication with the control planes of each of the switches of the MPLS network. The NOC 20 communicates with the MPLS switches S2-S8 using OpenFlow messages and the OpenFlow switching protocol. The OpenFlow protocol is defined by the OpenFlow Switch Consortium in OpenFlow Switch Specification (http://www.opennetworking.org/images/stories/downloads/specification/openflow-spec-v1.3.0.pdf). The MPLS switches S2-S8 are also referred to as OpenFlow switches. Arrow 21 represents an OpenFlow message that is sent from the NOC to the control plane functionality of switch S2. Arrow 22 represents an OpenFlow message that is sent in the opposite direction from the control plane functionality of switch S2 to the NOC. Each of the MPLS switches S2-S8 includes a flow table of flow entries. For an incoming packet received onto a switch, the switch uses its flow table to determine another MPLS switch to which the packet will be forwarded. For example, if an incoming packet to a switch has an MPLS label LBLX, then the receiving switch consults its flow table and looks for a flow entry whose incoming MPLS label is indicated to be LBLX. If there is such an entry, then the entry will indicate an action for the switch to take, and the entry will also indicate an output port from which the switch is to send the packet on to another switch. Alternatively, if the switch is a switch on the edge of the MPLS network and is the first switch of the MPLS network to receive the packet, then the packet will generally not have an MPLS label. In such a case, the IP destination and IP source addresses of the packet are used by the switch to lookup an appropriate entry in the flow table. The flow entry in the flow table will have a flow entry for an incoming packet having such an IP source and destination address. The flow entry will indicate a MPLS label that is to be used to encapsulate the IP packet. The flow entry will also indicate an output port from which the encapsulated IP packet should be forwarded on its way to another switch. Consider, for example, switch S2. If the flow entry found for the incoming packet indicates a first output port, then the packet will be output from that output port and will pass through segment 7 to switch S8. If, on the other hand, the flow entry indicates a second output port, then the packet will be output from that output port and the packet will pass through segment 8 to switch S3. This is only a simplified explanation of the operation of an MPLS network. For further detailed information, see: http://en.wikipedia.org/wiki/Multiprotocol_Label_Switching.

The flow tables are maintained by the NOC. The NOC, using an OpenFlow "Modify-State" message, can cause a flow entry in the flow table of a specified switch to be added, to be deleted, or to be modified. By this mechanism, the NOC sends out OpenFlow messages to the various switches and configures the flow tables in those switches. The flow entries in the flow tables define paths through the MPLS network 1 for each flow of packets. The structure of FIG. 3 is logically separate from the MPLS switch network depicted in FIG. 1. The NOC 20 of FIG. 3 may, for example, be part of one of the switches of FIG. 1, or the NOC 20 may be a separate network device not depicted in FIG. 1. Similarly, the communication links shown in the FIG. 3 between the NOC and the switches may be the same segments depicted in FIG. 1 or may be other communication links not shown in FIG. 1.

Figure 4:
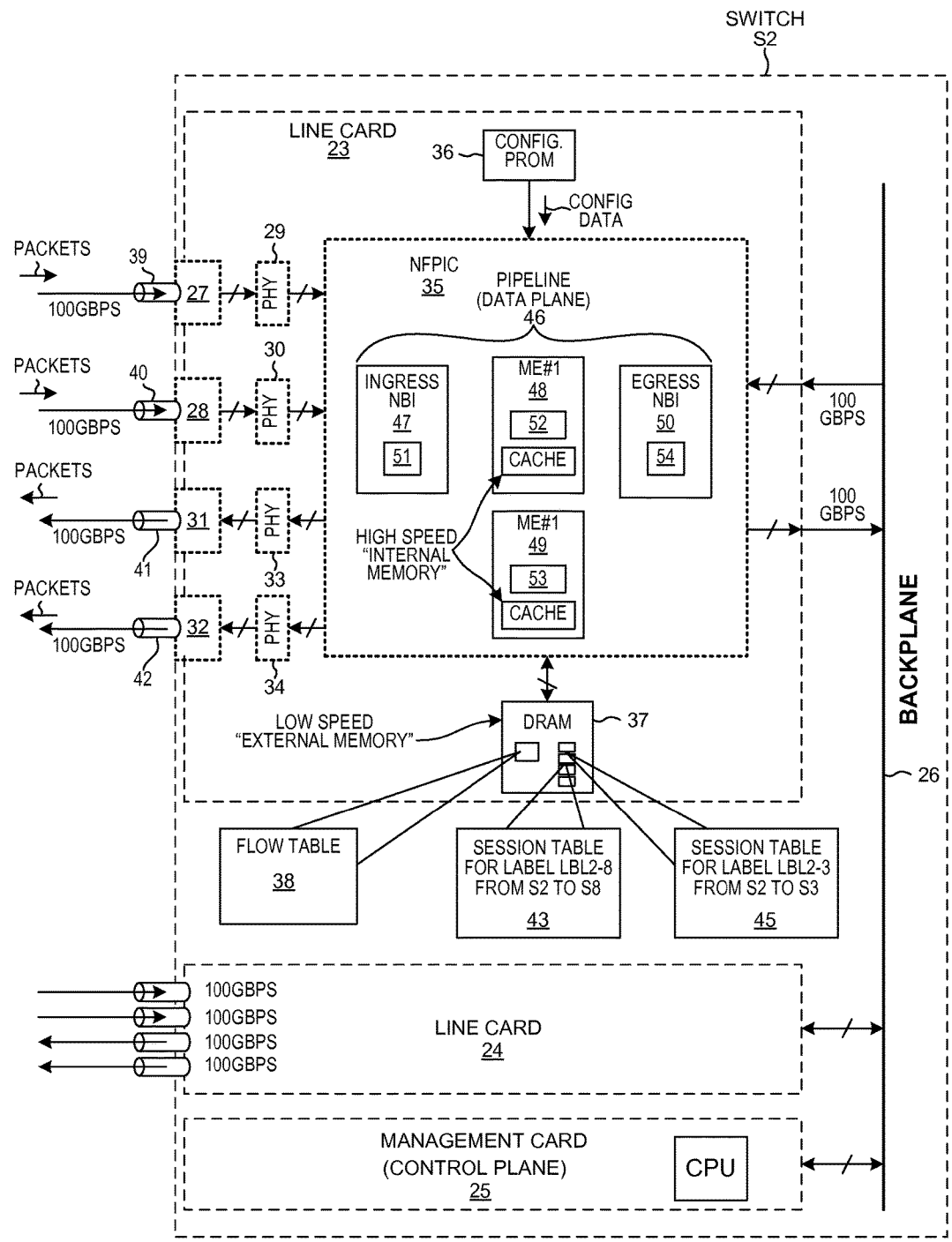
FIG. 4 is a diagram of one of the MPLS switches of the MPLS network with packet prediction capability.

FIG. 4 is a diagram of switch S2. Switch S2 is representative of one or more of the switches in MPLS network 1 in this example. Switch S2 includes a plurality of line cards 23 and 24, and a management card 25. Management card 25 provides control plane functionality for the control and management system 20 of FIG. 4. The line cards 23 and 24 and the management card 25 are connected together via a backplane 26. The line cards are of identical construction. Line card 23, for example, includes ingress optical transducers 27 and 28, ingress PHY devices 29 and 30, egress optical transducers 31 and 32, egress PHI devices 33 and 34, a Network Flow Processor Integrated Circuit (NFPIC) 35, a configuration PROM 36, a memory 37, as well as other devices (not shown). The flow table 38 of the switch S2 is resident in memory 37. Under control of the NFPIC 35, a packet received onto line card 23 on a given input port (into a particular ingress optical transducer) is communicated through the switch and is output onto an appropriate output port (an appropriate egress optical transducer) as indicated by a flow entry in flow table 38. The output port may be either an output port of line card 23, or may be an output port of another line card of the switch. The optical transducers 27, 28, 31 and 32 are coupled to optical cables 39, 40, 41 and 42, respectively. These optical cables in turn extend to other switches of the MPLS network 1. A single segment of the MPLS network between two switches in this example comprises two such optical cables in order to support bidirectional packet communication across the segment.

Figure 9:
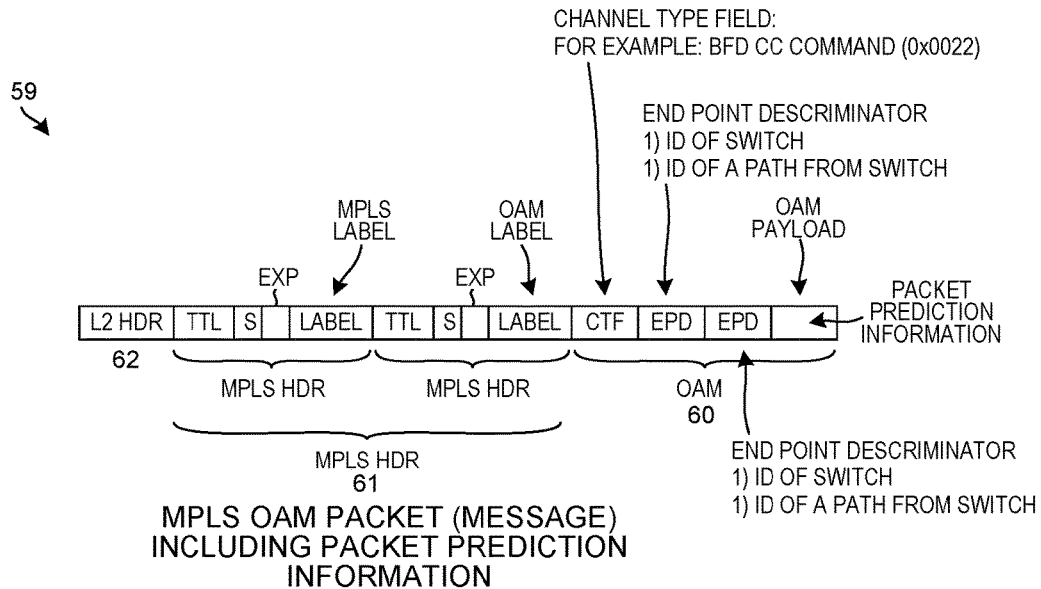
FIG. 9 is a diagram of an MPLS OAM packet (message) including packet prediction information.

Memory 37 may contain, in addition to flow table 38, one or more OAM (Operations, Administration and Maintenance) session tables. An OAM session in accordance with IETF (Internet Engineering Task Force) RFC 6291 is set up for a particular flow of packets through a tunnel of a segment between two switches. Consider, for example, segment 7 between switches S2 and S8. Switch S2 may be programmed to send an OAM packet (also known as an "OAM message") called a keep-alive packet across segment 7 to switch S8 through a tunnel across the segment 7. OAM packets are also referred to as "OAM messages" herein. In another example, switch S2 may be programmed to send an OAM packet that also includes packet prediction information across segment 7 to switch 8 through a tunnel across the segment 7. FIG. 9 is a diagram of an MPLS OAM packet 59 having an OAM label portion 60, an MPLS header portion 61, and a L2 header 62. Switch S8 receives the OAM packet and in accordance with OAM session rules as determined by its provisioning OAM session table, switch S8 sends back to switch S2 another OAM keep-alive packet across the tunnel and segment. If switch S2 receives the return packet, then switch S2 determines that the tunnel of segment 7 is functional and is meeting certain operational requirements. The OAM session tables in the switches on either end of the segment determine, among other things, the frequency with which such OAM packets are sent to monitor the segment. In one example, there are OAM sessions monitoring all provisioned tunnels of all the segments of MPLS network 1.

The second entity 4 may request of the first entity 2 that packets of the future flow be provisioned and allowed to be sent across MPLS network 1. Second entity 4 may specifically request transport of packets of this flow across MPLS network 1 from MPLS switch S2 to MPLS switch S5. In this case, as mentioned above, this flow of packets will carry voice call data for a call between cellular telephone 17 and cellular telephone 18.

The first entity (the ISP) then informs the second entity (the operator of customer network 3) that the second entity can send packets of the flow to switch S2 for transport across the MPLS network to switch S5. The NOC, however, does not cause the flow table of any switch in the MPLS network to be updated to include a flow entry for the flow, nor does the NOC cause an OAM session to be set up for monitoring the passage of the flow through the MPLS network.

The second entity then sends a packet of the flow to switch S2. Switch S2 receives the packet and consults its flow table, but switch S2 finds no flow entry in its flow table for the packet. Because switch S2 is on the edge of the MPLS network, and because the packet is being received from outside the MPLS network and onto the MPLS network, switch S2 uses the IP destination and IP source addresses of the packet to look for a matching flow entry. Switch S2 consults its flow table and determines that the packet has no matching flow entry. Switch S2 therefore does not know how to forward the packet, so switch S2 sends an OpenFlow message to the NOC. The OpenFlow message is an indication to NOC 20 that switch S2 has no flow entry for the flow of the received packet.

In response, NOC 20 assigns an MPLS label for use of switch S2 in forwarding packets of the new flow. The NOC then sends one or more OpenFlow messages to each of the switches that are located along a desired primary path for the flow through the MPLS network. In one example, the desired primary path may be from switch S2, to switch S8, to switch S5. The information carried in the OpenFlow message or messages includes, for each switch in the primary path, 1) one or more flow entries for the switch to add into its flow table, and 2) OAM session table information for the switch to provision one or more OAM sessions to monitor segments across which the flow will pass. NOC 20 therefore sends OpenFlow messages to switch S2 causing a flow entry to be added to the flow table of switch S2 and causing an OAM session table to be loaded for an OAM session between switches S2 and S8. NOC also sends OpenFlow messages to switch S8 causing a flow entry to be added to the flow table of switch S8 and causing an OAM session table to be loaded for the OAM session between switches S2 and S8. In the present example, the segment 7 between switch S2 and switch S8 may fail. A fast failover capability is provided so that if this segment 7 is detected by OAM processes to have failed, then packets that would otherwise have been sent from switch S2 to switch S8 across the failed segment will be sent across segment 8 from switch S2 to switch S3. Segment 7 is referred to as the primary segment. Segment 8 is referred to as the secondary segment.

Accordingly, NOC 20 also sends OpenFlow messages to others of the switches to set up such secondary paths through the switches of network 1 to handle situations should various ones of the primary segments happen to fail.

The time required for a switch to perform the routing of a packet is dependent upon the time required by the switch to load the flow entry required to determine how the packet is to be routed, see: U.S. patent application Ser. No. 13/675,453 entitled "INTER-PACKET INTERVAL PREDICTION OPERATING ALGORITHM," by Nicolaas J. Viljoen, Niel Viljoen, and Gavin Stark, filed on Nov. 13, 2012, now issued as U.S. Pat. No. 9,344,384 (the entire subject matter of which is incorporated herein by reference). Caching flow entries in local high speed memory before the packet is received reduces the time required by the switch to determine how the packet is to be routed. In a first novel aspect, packet prediction information can be communicated to switches in an MPLS network utilizing an OpenFlow message. In a second novel aspect, packet prediction information can be communicated to switches in an MPLS network utilizing one or more OAM packets (messages).

Figure 5:
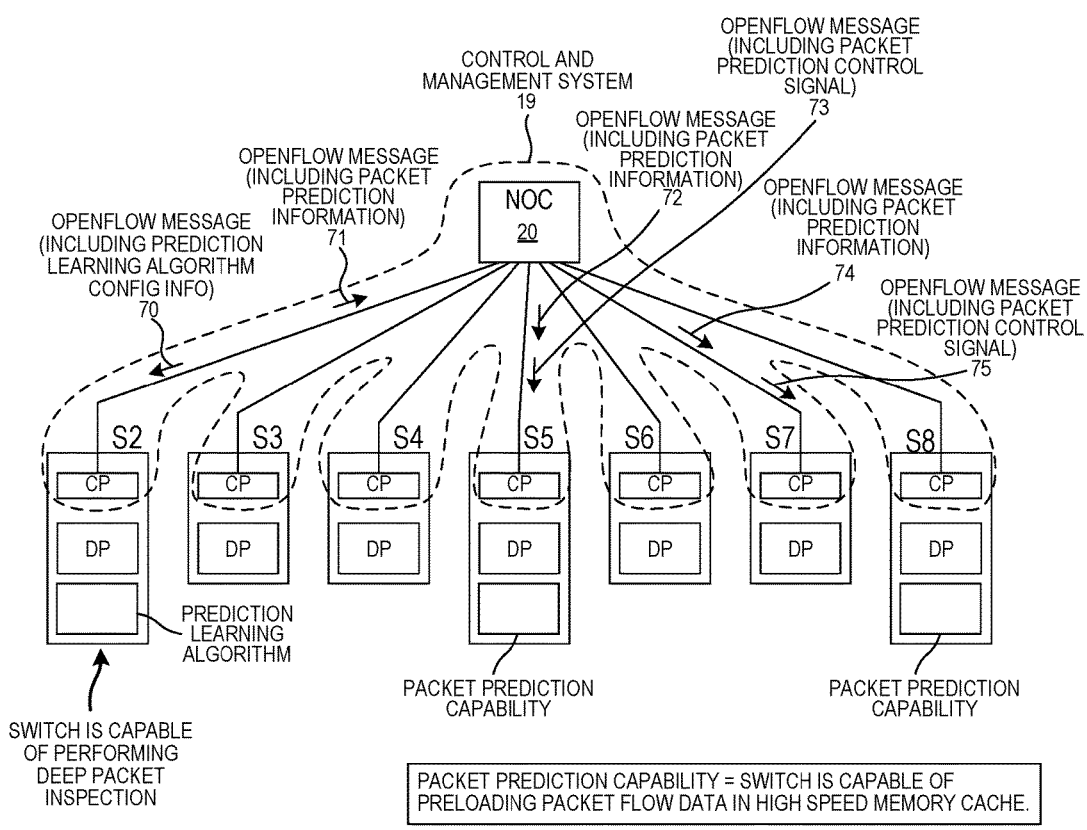
FIG. 5 is a diagram of an OpenFlow control and management part of the MPLS network of FIG. 1 utilizing OpenFlow messaging to communicate packet prediction information and packet prediction control signals.
Figure 10:
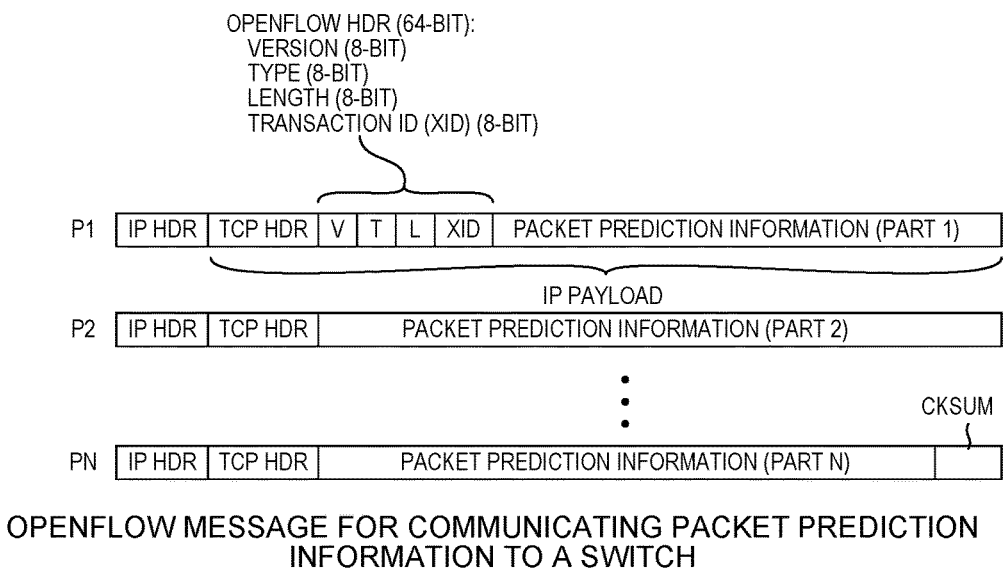
FIG. 10 is a diagram of an OpenFlow message for communicating packet prediction information to a switch in a MPLS network.

FIG. 5 is a diagram of a control and management system 19 of an MPLS network utilizing an OpenFlow message to communicate packet prediction information and packet prediction control signals to switches within the MPLS network. Referring to FIG. 1, incoming packets received by the ISP's MPLS network are routed to switch S2. Switch S2 is capable of performing a prediction learning algorithm. In one example, switch S2 performs the prediction learning algorithm described in U.S. patent application Ser. No. 13/675,620 entitled "INTER-PACKET INTERVAL PREDICTION LEARNING ALGORITHM," by Nicolaas J. Viljoen, Niel Viljoen, and Gavin Stark, filed on Nov. 13, 2012, now issued as U.S. Pat. No. 9,344,384 (the entire subject matter of which is incorporated herein by reference). In one example, switch S2 receives the first seven packets of a specific pair of flows and performs deep packet inspection on each of the first seven packets to create an application protocol estimation table and an Inter-Packet Interval (IPI) prediction table per application protocol. The application protocol estimation table and the IPI prediction table for each application protocol are collectively referred to as "packet prediction information" in the present application. FIG. 21 is a diagram that illustrates an example of the application protocol estimation table. FIG. 22 is a diagram that illustrates an example of the IPI prediction table. In one novel aspect, switch S2 then communicates the packet prediction information to the Network Operation Center (NOC) 20 via one or more OpenFlow messages 71. FIG. 10 illustrates one example of how the packet prediction information can be communicated in an OpenFlow message. NOC 20 then communicates the packet prediction information to one or more switches via one or more OpenFlow messages 72 and 74. FIG. 10 illustrates one example of how the packet prediction information can be communicated in an OpenFlow message. In order to utilize the packet prediction information, each switch receiving the packet prediction information must have packet prediction capability. In one example, the packet prediction capability is as described in U.S. patent application Ser. No. 13/675,453 entitled "INTER-PACKET INTERVAL PREDICTION OPERATING ALGORITHM," by Nicolaas J. Viljoen, Niel Viljoen, and Gavin Stark, filed on Nov. 13, 2012, now issued as U.S. Pat. No. 9,344,384 (the entire subject matter of which is incorporated herein by reference). In another novel aspect, the switch receiving the packet prediction information uses the application protocol estimation table to estimate the application protocol of the received packet based on packet size state and packet number, and uses the inter-packet interval prediction table to predict the next packet arrival time based on the estimated application protocol. The switch then preloads the packet flow data for the next packet in the memory cache within the switch before the predicted next packet arrival time. Memory cache is also referred to as high speed memory in the present application. The preloading of the packet flow data in the high speed memory decreases the time required for the switch to process and send the next packet because the switch does not have to access a larger, lower speed, memory to read the necessary packet flow data after receiving the packet when the packet flow data has already been preloaded.

Figure 17:
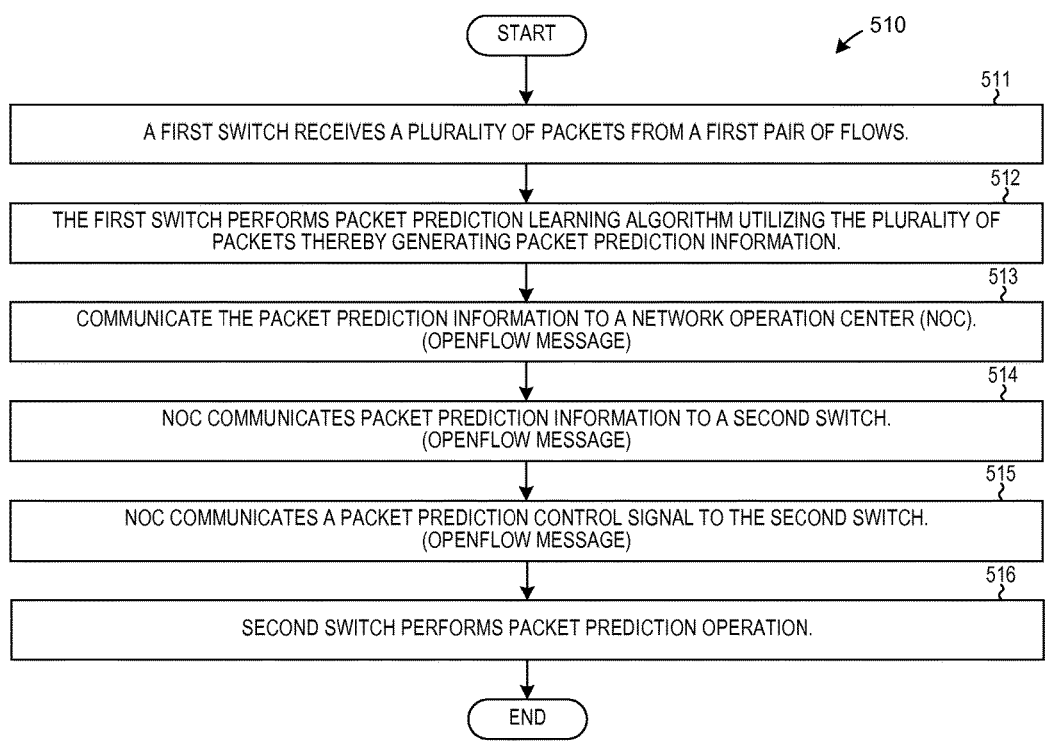
FIG. 17 is a flowchart describing the steps performed in an exemplary operation of the network of switches illustrated in FIG. 5.

In a novel aspect, the switch receiving the packet prediction information only utilizes the packet prediction information when instructed to do so by the NOC 20. For example, NOC 20 may send a packet prediction control signal via one or more OpenFlow messages 73, 75 to one or more switches S5, S8. The packet prediction control signal indicates if the receiving switch is to utilize the packet prediction information. This architecture may be used in a situation where the NOC 20 communicates the packet prediction information to a group of switches, some of which are not capable of utilizing the packet prediction information. In this situation, the NOC 20 will send a packet prediction control signal that disables the use of the packet prediction information to all switches that are not capable of utilizing the packet prediction information. Alternatively, the NOC 20 will send a packet prediction control signal that enables the use of the packet prediction information to all switches that are capable of utilizing the packet prediction information. FIG. 17 is a flowchart describing the steps performed in an exemplary operation of the network of switches illustrated in FIG. 5.

In another novel aspect, the NOC 20 may instruct the receiving switch to only utilize the packet prediction information for specific application protocols. For example, the NOC 20 may communicate a packet prediction control signal to a switch that instructs the receiving switch to only utilize the packet prediction information for TCP and SKYPE application protocols.

It is noted that the example of the MPLS entry switch S2 performing the prediction learning algorithm is only exemplary. In other embodiments, other switches within the MPLS network, that are not entry switches, can be utilized to perform the prediction learning algorithm.

Multiple switches with the MPLS network may simultaneously perform prediction learning algorithms and communicate the resulting packet prediction information to NOC 20. In this situation, the NOC 20 may use various methods to select packet prediction information from one of the multiple switches. In one example, the NOC 20 may generate an average inter-packet interval value for each application protocol for the packet prediction information received from each switch. NOC 20 may then select the packet prediction information that has the shortest average inter-packet interval value. In another example, the NOC 20 may select packet prediction information that has the longest average inter-packet interval value. Alternatively, it may be beneficial for NOC 20 to select the packet prediction information that has the median average inter-packet interval value. Alternatively, the NOC 20 may use a priority list of switches to select the packet prediction information communicated from the switch assigned the highest priority on the list. In one example, the priority list assigns a higher priority to switches that are closer to MPLS network entry point.

In another novel aspect, the NOC 20 may communicate prediction learning algorithm configuration information to a switch via one or more OpenFlow messages 70. The prediction learning algorithm configuration information may specify various aspects of the prediction learning algorithm. For example, the prediction learning algorithm configuration information may indicate the number of packets on which perform deep packet inspection is required to generate the application protocol estimation table. The prediction learning algorithm configuration information may also include the number of packets on which perform deep packet inspection is required to generate the inter-packet interval prediction table for each application protocol. The prediction learning algorithm configuration information may indicate a specific group of application protocol for which application protocol estimation tables are to be created by the switch. For example, it may be most beneficial to perform packet prediction only on a select group of application protocols. In this situation, the NOC 20 could send prediction learning algorithm configuration information that instructs the switch to only generate packet prediction information for the select group of application protocols. The prediction learning algorithm configuration information may also include the number of inter-packet intervals to be created for each inter-packet interval prediction table.

Figure 6:
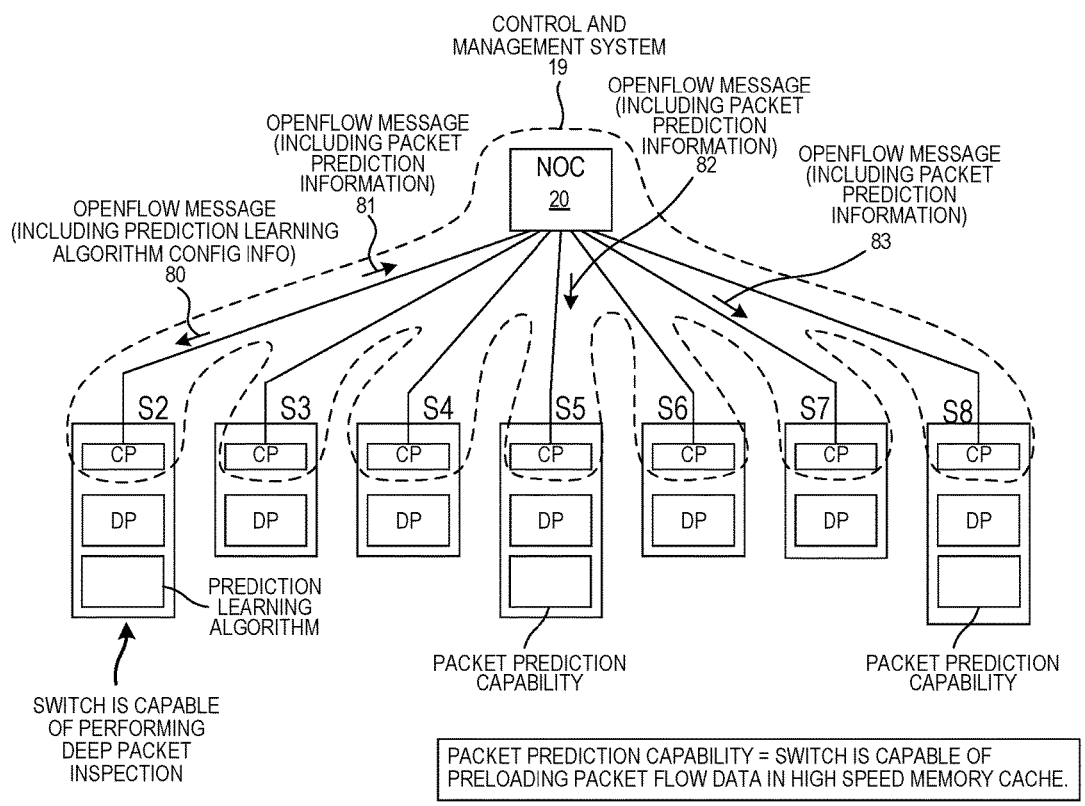
FIG. 6 is a diagram of an OpenFlow control and management part of the MPLS network of FIG. 1 utilizing OpenFlow messaging to communicate packet prediction information.

FIG. 6 is a diagram of a control and management system 19 of an MPLS network utilizing OpenFlow message to communicate packet prediction information to switches within the MPLS network (switches determine independently if packet prediction is to be used). Referring to FIG. 1, incoming packets received by the ISP's MPLS network are routed to switch S2. Switch S2 is capable of performing a prediction learning algorithm. In one example, switch S2 performs the prediction learning algorithm described in U.S. patent application Ser. No. 13/675,620 entitled "INTER-PACKET INTERVAL PREDICTION LEARNING ALGORITHM," by Nicolaas J. Viljoen, Niel Viljoen, and Gavin Stark, filed on Nov. 13, 2012 now issued as U.S. Pat. No. 9,344,384 (the entire subject matter of which is incorporated herein by reference). In one example, switch S2 receives the first seven packets of a specific pair of flows and performs deep packet inspection on each of the first seven packets to create an application protocol estimation table and an Inter-Packet Interval (IPI) prediction table per application protocol. The application protocol estimation table and the IPI prediction table for each application protocol are collectively referred to as "packet prediction information" in the present application. In one novel aspect, switch S2 then communicates the packet prediction information to the Network Operation Center (NOC) 20 via one or more OpenFlow messages 81. FIG. 10 illustrates one example of how the packet prediction information can be communicated in an OpenFlow message. NOC 20 then communicates the packet prediction information to one or more switches via one or more OpenFlow messages 82 and 83. FIG. 10 illustrates one example of how the packet prediction information can be communicated in an OpenFlow message. In order to utilize the packet prediction information, each switch receiving the packet prediction information must include a packet prediction capability. In one example, the packet prediction capability is as described in U.S. patent application Ser. No. 13/675,453 entitled "INTER-PACKET INTERVAL PREDICTION OPERATING ALGORITHM," by Nicolaas J. Viljoen, Niel Viljoen, and Gavin Stark, filed on Nov. 13, 2012, now issued as U.S. Pat. No. 9,344,384 (the entire subject matter of which is incorporated herein by reference). In another novel aspect, the switch receiving the packet prediction information uses the application protocol estimation table to estimate the application protocol of the received packet based on packet size state and packet number, and uses the inter-packet interval prediction table to predict the next packet arrival time based on the estimated application protocol. The switch then preloads the packet flow data for the next packet in the memory cache within the switch before the predicted next packet arrival time. Memory cache is also referred to as high speed memory in the present application. The preloading of the packet flow data in the high speed memory decreases the time required for the switch to process and send the next packet because the switch does not have to access a larger, lower speed, memory to read the necessary packet flow data after receiving the packet when the packet flow data has already been preloaded.

Figure 18:
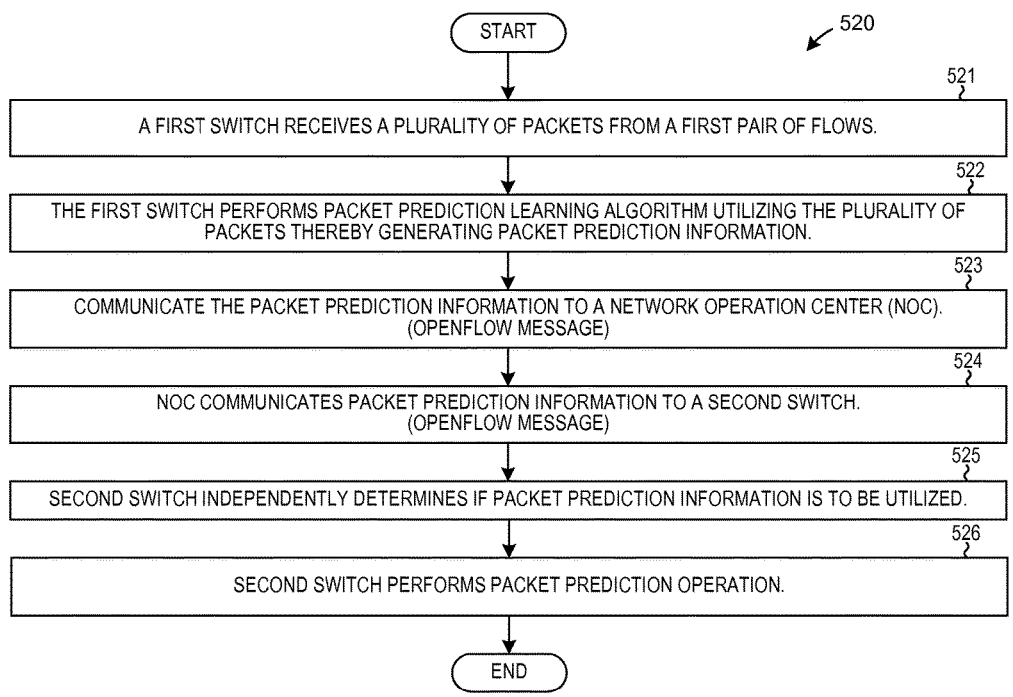
FIG. 18 is a flowchart describing the steps performed in an exemplary operation of the network of switches illustrated in FIG. 6.

In a novel aspect, the switch receiving the packet prediction information determines if the packet prediction information is to be utilized by the receiving switch. For example, the switch may be preprogrammed to detect packet prediction information included in OpenFlow messages. Alternatively, the switch may not be programmed to detect packet prediction information included in OpenFlow messages. FIG. 18 is a flowchart describing the steps performed in an exemplary operation of the network of switches illustrated in FIG. 6.

In another novel aspect, the receiving switch may be programmed to only utilize the packet prediction information for specific application protocols. For example, the receiving switch may be programmed to only utilize the packet prediction information for TCP and SKYPE application protocols.

In another novel aspect, the NOC 20 may communicate prediction learning algorithm configuration information to a switch via one or more OpenFlow messages 80. The prediction learning algorithm configuration information may specify various aspects of the prediction learning algorithm. For example, the prediction learning algorithm configuration information may indicate the number of packets on which perform deep packet inspection is required to generate the application protocol estimation table. The prediction learning algorithm configuration information may also include the number of packets on which perform deep packet inspection is required to generate the inter-packet interval prediction table for each application protocol. The prediction learning algorithm configuration information may indicate a specific group of application protocol for which application protocol estimation tables are to be created by the switch. For example, it may be most beneficial to perform packet prediction only on a select group of application protocols. In this situation, the NOC 20 could send prediction learning algorithm configuration information that instructs the switch to only generate packet prediction information for the select group of application protocols. The prediction learning algorithm configuration information may also include the number of inter-packet intervals to be created for each inter-packet interval prediction table.

Figure 7:
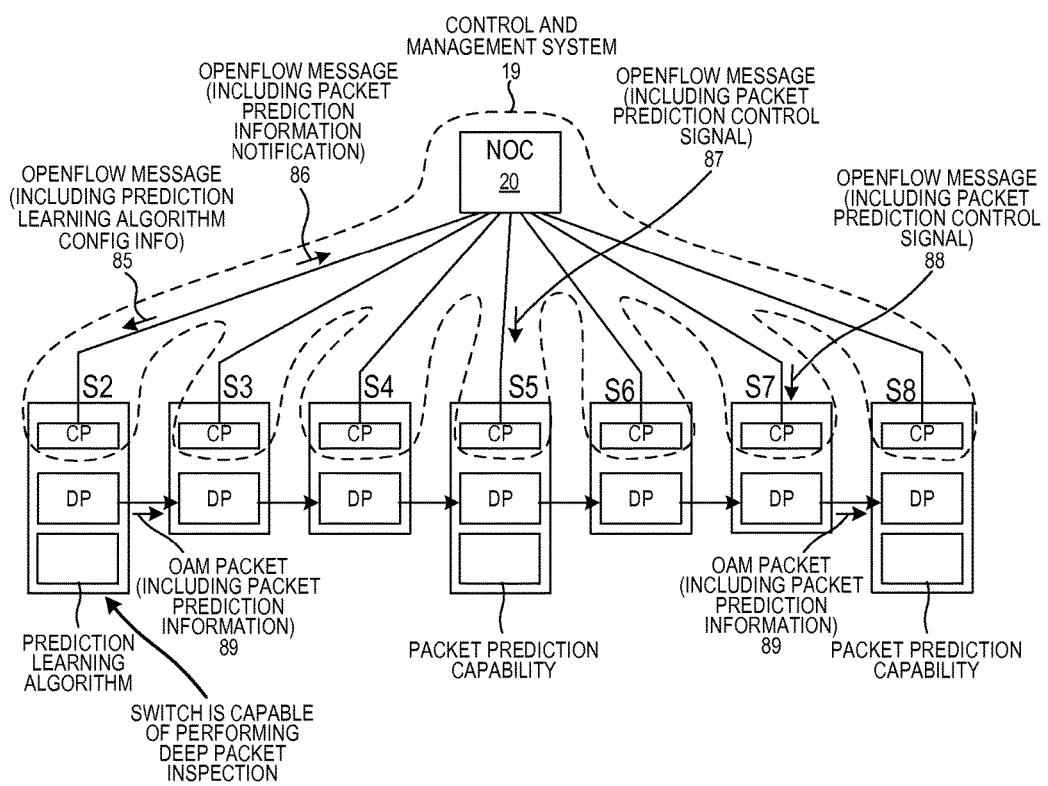
FIG. 7 is a diagram of an OpenFlow control and management part of the MPLS network of FIG. 1 utilizing OAM packets to communicate packet prediction information and OpenFlow messaging to communicate packet prediction control signals.

FIG. 7 is a diagram of a control and management system 19 of an MPLS network utilizing OAM message to communicate packet prediction information to switches within the MPLS network and utilizing OpenFlow messaging to communicate packet prediction control signals to switches within the MPSL network. Referring to FIG. 1, incoming packets received by the ISP's MPLS network are routed to switch S2. Switch S2 is capable of performing a prediction learning algorithm. In one example, switch S2 performs the prediction learning algorithm described in U.S. patent application Ser. No. 13/675,620 entitled "INTER-PACKET INTERVAL PREDICTION LEARNING ALGORITHM," by Nicolaas J. Viljoen, Niel Viljoen, and Gavin Stark, filed on Nov. 13, 2012, now issued as U.S. Pat. No. 9,344,384 (the entire subject matter of which is incorporated herein by reference). In one example, switch S2 receives the first seven packets of a specific pair of flows and performs deep packet inspection on each of the first seven packets to create an application protocol estimation table and an Inter-Packet Interval (IPI) prediction table per application protocol. The application protocol estimation table and the IPI prediction table for each application protocol are collectively referred to as "packet prediction information" in the present application. In a novel aspect, switch S2 communicates the packet prediction information to one or more switches within the MPLS network via one or more OAM messages. FIG. 9 illustrates one example of how packet prediction information can be communicated via the OAM payload portion of an OAM message. The OAM message may be a direct OAM message, for example between switch S2 and switch S8, or a propagated OAM message, for example from switch S2 to switch S8 and then from switch S8 to switch S5. In another example, the packet prediction information can be propagated to all switches in the MPLS network via multiple OAM messages.

In another novel aspect, switch S2 then communicates the packet prediction information notification to NOC 20 via one or more OpenFlow messages 86. Packet prediction information notification notifies the NOC 20 that packet prediction information has been created by switch S2. In one example, packet prediction information notification also indicates the switches to which the packet prediction information has been communicated. As shown in FIG. 10, packet prediction information notification can be communicated in the payload portion of the OpenFlow message. NOC 20 then communicates a packet prediction control signal to one or more switches via one or more OpenFlow messages 87 and 88. As shown in FIG. 10, the packet prediction information notification can be communicated in the payload portion of the OpenFlow message. In order to utilize the packet prediction information, each switch receiving the packet prediction information must include a packet prediction capability. In one example, the packet prediction capability is as described in U.S. patent application Ser. No. 13/675,453 entitled "INTER-PACKET INTERVAL PREDICTION OPERATING ALGORITHM," by Nicolaas J. Viljoen, Niel Viljoen, and Gavin Stark, filed on Nov. 13, 2012, now issued as U.S. Pat. No. 9,344,384 (the entire subject matter of which is incorporated herein by reference). In another novel aspect, the switch receiving the packet prediction information uses the application protocol estimation table to estimate the application protocol of the received packet based on packet size state and packet number, and uses the inter-packet interval prediction table to predict the next packet arrival time based on the estimated application protocol. The switch then preloads the packet flow data for the next packet in the memory cache within the switch before the predicted next packet arrival time. Memory cache is also referred to as high speed memory in the present application. The preloading of the packet flow data in the high speed memory decreases the time required for the switch to process and send the next packet because the switch does not have to access a larger, lower speed, memory to read the necessary packet flow data after receiving the packet when the packet flow data has already been preloaded.

Figure 19:
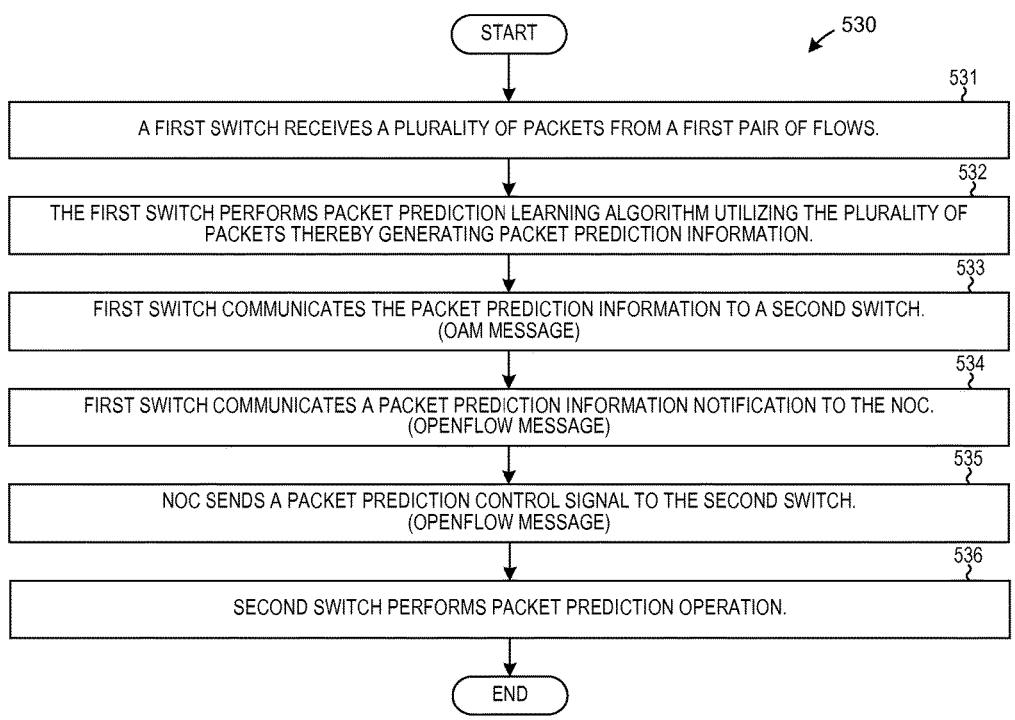
FIG. 19 is a flowchart describing the steps performed in an exemplary operation of the network of switches illustrated in FIG. 7.

In a novel aspect, the switch receiving the packet prediction information only utilizes the packet prediction information when instructed to do so by the NOC 20. For example, NOC 20 may send a packet prediction control signal via one or more OpenFlow messages 87, 88 to one or more switches S5, S8. The packet prediction control signal indicates if the receiving switch is to utilize the packet prediction information. This architecture may be used in a situation where the packet prediction information is communicated to a group of switches, some of which are not capable of utilizing the packet prediction information. In this situation, the NOC 20 will send a packet prediction control signal that disables the use of the packet prediction information to all switches that are not capable of utilizing the packet prediction information. Alternatively, the NOC 20 will send a packet prediction control signal that enables the use of the packet prediction information to all switches that are capable of utilizing the packet prediction information. FIG. 19 is a flowchart describing the steps performed in an exemplary operation of the network of switches illustrated in FIG. 7.

In another novel aspect, the NOC 20 may instruct the receiving switch to only utilize the packet prediction information for specific application protocols. For example, the NOC 20 may communicate a packet prediction control signal to a switch that instructs the receiving switch to only utilize the packet prediction information for TCP and SKYPE application protocols.

It is noted that the example of the MPLS entry switch S2 performing the prediction learning algorithm is only exemplary. In other embodiments, other switches within the MPLS network, that are not entry switches, can be utilized to perform the prediction learning algorithm.

In another novel aspect, the NOC 20 may communicate prediction learning algorithm configuration information to a switch via one or more OpenFlow messages 85. The prediction learning algorithm configuration information may specify various aspects of the prediction learning algorithm. For example, the prediction learning algorithm configuration information may indicate the number of packets on which perform deep packet inspection is required to generate the application protocol estimation table. The prediction learning algorithm configuration information may also include the number of packets on which perform deep packet inspection is required to generate the inter-packet interval prediction table for each application protocol. The prediction learning algorithm configuration information may indicate a specific group of application protocol for which application protocol estimation tables are to be created by the switch. For example, it may be most beneficial to perform packet prediction only on a select group of application protocols. In this situation, the NOC 20 could send prediction learning algorithm configuration information that instructs the switch to only generate packet prediction information for the select group of application protocols. The prediction learning algorithm configuration information may also include the number of inter-packet intervals to be created for each inter-packet interval prediction table.

Figure 8:
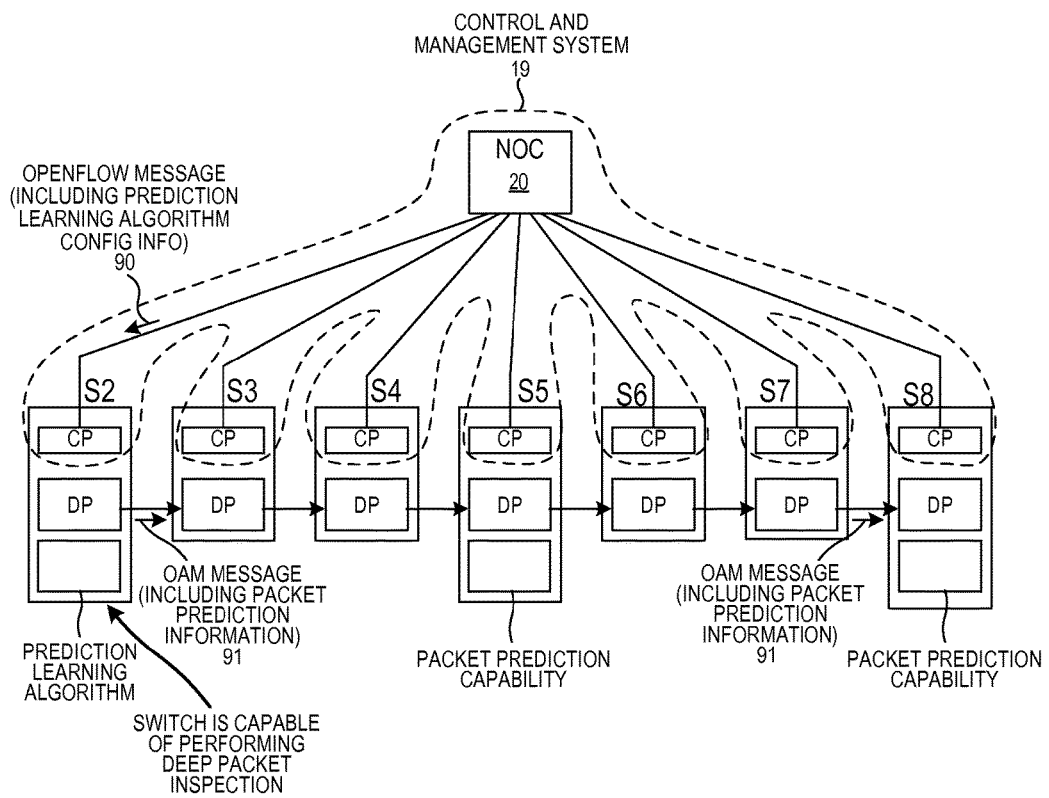
FIG. 8 is a diagram of an OpenFlow control and management part of the MPLS network of FIG. 1 utilizing oam packets to communicate packet prediction information.

FIG. 8 is a diagram of a control and management system 19 of an MPLS network utilizing OAM packet to communicate packet prediction information to switches within the MPLS network (switches determine independently if the packet prediction is to be used). Referring to FIG. 1, incoming packets received by the ISP's MPLS network are routed to switch S2. Switch S2 is capable of performing a prediction learning algorithm. In one example, switch S2 performs the prediction learning algorithm described in U.S. patent application Ser. No. 13/675,620 entitled "INTER-PACKET INTERVAL PREDICTION LEARNING ALGORITHM," by Nicolaas J. Viljoen, Niel Viljoen, and Gavin Stark, filed on Nov. 13, 2012 now issued as U.S. Pat. No. 9,344,384 (the entire subject matter of which is incorporated herein by reference). In one example, switch S2 receives the first seven packets of a specific pair of flows and performs deep packet inspection on each of the first seven packets to create an application protocol estimation table and an Inter-Packet Interval (IPI) prediction table per application protocol. The application protocol estimation table and the IPI prediction table for each application protocol are collectively referred to as "packet prediction information" in the present application. In a novel aspect, switch S2 communicates the packet prediction information to one or more switches within the MPLS network via one or more OAM messages. FIG. 9 illustrates one example of how packet prediction information can be communicated via the OAM payload portion of an OAM message. The OAM message may be a direct OAM message, for example between switch S2 and switch S8, or a propagated OAM message, for example from switch S2 to switch S8 and then from switch S8 to switch S5. In another example, the packet prediction information can be propagated to all switches in the MPLS network via multiple OAM messages.

In another novel aspect, switch S2 then communicates the packet prediction information notification to NOC 20 via one or more OpenFlow messages 86. In order to utilize the packet prediction information, each switch receiving the packet prediction information must include a packet prediction capability. In one example, the packet prediction capability is as described in U.S. patent application Ser. No. 13/675,453 entitled "INTER-PACKET INTERVAL PREDICTION OPERATING ALGORITHM," by Nicolaas J. Viljoen, Niel Viljoen, and Gavin Stark, filed on Nov. 13, 2012, now issued as U.S. Pat. No. 9,344,384 (the entire subject matter of which is incorporated herein by reference). In another novel aspect, the switch receiving the packet prediction information uses the application protocol estimation table to estimate the application protocol of the received packet based on packet size state and packet number, and uses the inter-packet interval prediction table to predict the next packet arrival time based on the estimated application protocol. The switch then preloads the packet flow data for the next packet in the memory cache within the switch before the predicted next packet arrival time. Memory cache is also referred to as high speed memory in the present application. The preloading of the packet flow data in the high speed memory decreases the time required for the switch to process and send the next packet because the switch does not have to access a larger, lower speed, memory to read the necessary packet flow data after receiving the packet when the packet flow data has already been preloaded.

Figure 20:
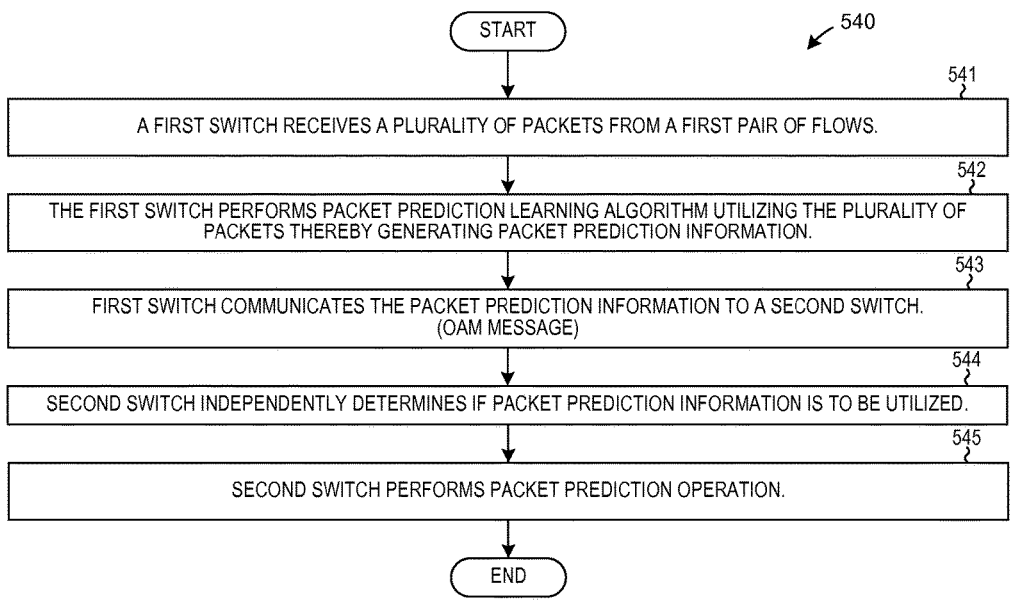
FIG. 20 is a flowchart describing the steps performed in an exemplary operation of the network of switches illustrated in FIG. 8.

In a novel aspect, the switch receiving the packet prediction information determines if the packet prediction information is to be utilized by the receiving switch. For example, the switch may be preprogrammed to detect packet prediction information included in OAM messages. Alternatively, the switch may not be programmed to detect packet prediction information included in OAM messages. FIG. 20 is a flowchart describing the steps performed in an exemplary operation of the network of switches illustrated in FIG. 8.

In another novel aspect, the receiving switch may be programmed to only utilize the packet prediction information for specific application protocols. For example, the receiving switch may be programmed to only utilize the packet prediction information for TCP and SKYPE application protocols.

It is noted that the example of the MPLS entry switch S2 performing the prediction learning algorithm is only exemplary. In other embodiments, other switches within the MPLS network, that are not entry switches, can be utilized to perform the prediction learning algorithm.

In another novel aspect, the NOC 20 may communicate prediction learning algorithm configuration information to a switch via one or more OpenFlow messages 90. The prediction learning algorithm configuration information may specify various aspects of the prediction learning algorithm. For example, the prediction learning algorithm configuration information may indicate the number of packets on which deep packet inspection is required to generate the application protocol estimation table. The prediction learning algorithm configuration information may also include the number of packets on which perform deep packet inspection is required to generate the inter-packet interval prediction table for each application protocol. The prediction learning algorithm configuration information may indicate a specific group of application protocol for which application protocol estimation tables are to be created by the switch. For example, it may be most beneficial to perform packet prediction only on a select group of application protocols. In this situation, the NOC 20 could send prediction learning algorithm configuration information that instructs the switch to only generate packet prediction information for the select group of application protocols. The prediction learning algorithm configuration information may also include the number of inter-packet intervals to be created for each inter-packet interval prediction table.

FIG. 11 is a diagram of flow table 62 in switch S2 after flow entries have been added as a consequence of switch S2 having received OpenFlow message(s) from the NOC. Each row of the table is a flow entry.

A primary segment flow entry has been added for packets of the flow identified by IP source address of S1 and the IP destination address of switch S9. This primary flow entry indicates that the incoming packet should be encapsulated with the MPLS label LBL2-8, and should be forwarded out of the output port 1 that leads to switch S8. In a novel aspect, the OpenFlow message(s) received from the NOC also include packet prediction information of the primary and secondary flow. In one example, the packet prediction information is Inter-Packet Interval (IPI) information. During operation, switch S2 monitors the amount of time since the last packet of the primary flow was received and switch S2 loads the primary flow entry into the flow table before the next packet of the primary flow is predicted to arrive at switch S2. Switch S2 predicts when the next packet of the primary flow will arrive based on the packet number of the last packet received from the primary flow and the Inter-Packet Interval duration included in the Inter-Packet Interval (IPI) information.

A secondary segment flow entry has been added for packets of the flow identified by IP source address of S1 and the IP destination address of switch S9. This secondary flow entry indicates that the incoming packet should be encapsulated with the MPLS label LBL2-3, and should be forwarded on the output port 2 that leads to switch S3. During operation, switch S2 monitors the amount of time since the last packet of the secondary flow was received and switch S2 loads the secondary flow entry into the flow table before the next packet of the secondary flow is predicted to arrive at switch S2. Switch S2 predicts when the next packet of the secondary flow will arrive based on the packet number of the last packet received from the secondary flow and the Inter-Packet Interval duration included in the Inter-Packet Interval (IPI) information. In one example, IPI information is provided for each pair of flows. Other flow entries of the flow table are not shown in FIG. 11. For additional details, see: U.S. patent application Ser. No. 13/399,324, filed Feb. 17, 2012, titled "Configurable Mesh Data Bus In An Island-Based Network Flow Processor", by Gavin J. Stark (the entire subject matter of which is incorporated herein by reference).

FIG. 12 is a diagram of the flow table 63 of switch S8. A primary segment flow entry has been added for incoming packets that have MPLS labels of LBL2-8. This flow entry indicates that the MPLS label of LBL2-8 is to be replaced with the MPLS label LBL8-5 in the second column of the table. After label replacement, then packet is to be forwarded on the output port 1 that leads to switch S5.

In a novel aspect, the OpenFlow message(s) received from the NOC also include packet prediction information of the primary flow. In one example, the packet prediction information is Inter-Packet Interval (IPI) information. During operation, switch S8 monitors the amount of time since the last packet of the primary flow was received and switch S8 loads the primary flow entry into the flow table before the next packet of the primary flow is predicted to arrive at switch S8. Switch S8 predicts when the next packet of the primary flow will arrive based on the packet number of the last packet received from the primary flow and the Inter-Packet Interval duration included in the Inter-Packet Interval (IPI) information.

A secondary segment flow entry has also been added for packets of the flow identified MPLS label LBL2-8. If segment 9 is deemed to have failed, then the packet of this flow is to be forwarded by the secondary segment 16 to switch S7. The packet is then output onto output port 2 as indicated by the secondary segment flow entry. During operation, switch S7 monitors the amount of time since the last packet of the secondary flow was received and switch S7 loads the secondary flow entry into the flow table before the next packet of the secondary flow is predicted to arrive at switch S7. Switch S7 predicts when the next packet of the secondary flow will arrive based on the packet number of the last packet received from the secondary flow and the Inter-Packet Interval duration included in the Inter-Packet Interval (IPI) information. In one example, IPI information is provided for each pair of flows.

Other flow entries of the flow table are not shown in FIG. 12. As explained above, the NOC sends OpenFlow messages as shown in FIG. 13 to the various switches to configure their flow tables.

As explained above, the OpenFlow messages also contain OAM session information for establishing OAM sessions. FIG. 13 is a diagram of an OpenFlow message for adding an OAM session table to a switch.

Figure 14:
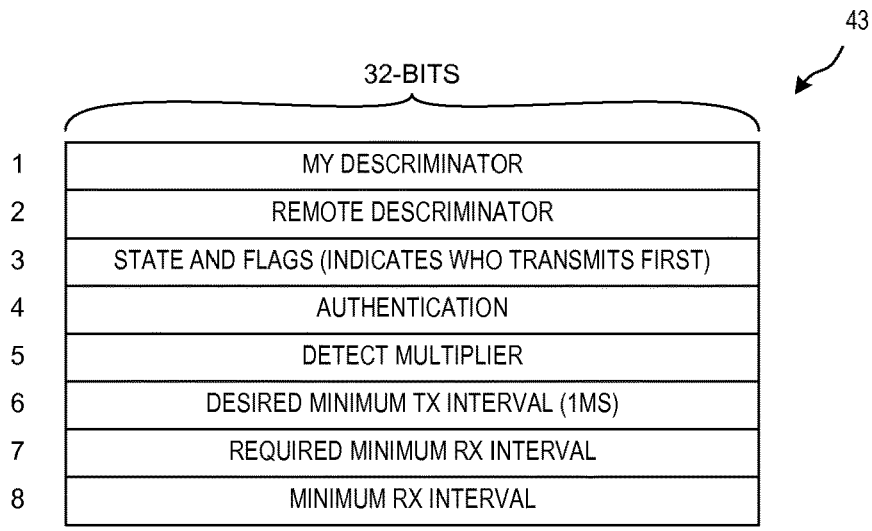
FIG. 14 is a diagram of an OAM session table in switch S2 of the MPLS network of FIG. 1.
Figure 15:
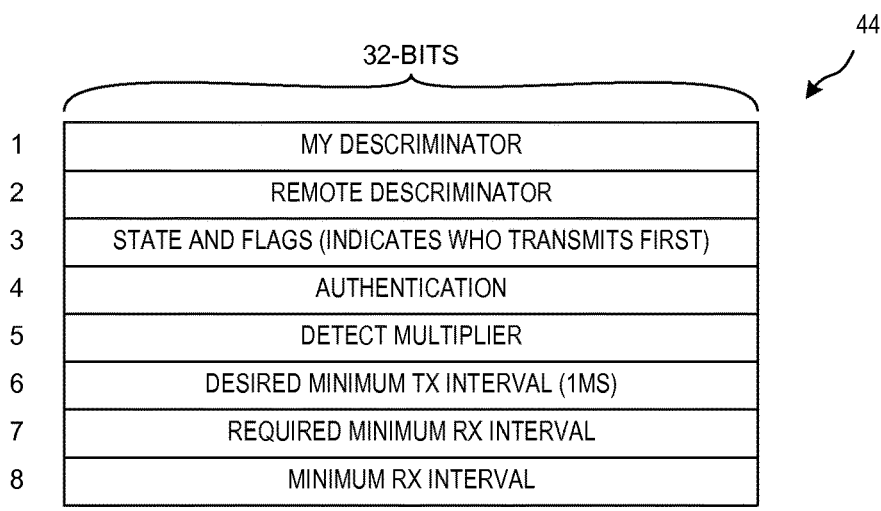
FIG. 15 is a diagram of an OAM session table in switch S8 of the MPLS network of FIG. 1.

FIG. 14 is a diagram of the OAM session table 43 that is setup in switch S2 to handle monitoring the S2-to-S8 segment 7 for packets of MPLS label LBL2-8. FIG. 15 is a diagram of the OAM session table 44 that is setup in switch S8 to handle monitoring the S2-to-S8 segment 7 for packets of MPLS label LBL2-8. The switches S2 and S8 on either end of segment 7 are provisioned with these OAM session tables using information received via the OpenFlow messages. The memory 37 of MPLS switch S2 of FIG. 4 is shown storing another OAM session table 45. This table is for monitoring the secondary segment 8 that extends between switch S2 and switch S3. NOC causes an OAM session table to be set up in any switch at and end of any segment across which packets for the flow may pass, whether the packet may pass this way along a primary path or along a secondary path in the event of a segment failure.

The NOC causes a switch to set up such an OAM session table by sending the switch an OpenFlow message 64 as shown in FIG. 13. OpenFlow message 64 includes an IP payload portion. This IP payload portion includes the OAM session table information 65.

The switches that have been provisioned with OAM session tables to handle, or potentially handle, packets of the flow then begin to send OAM packets back and forth to each other across the segments to be monitored in OAM sessions. In this way all the segments are monitored. Provided that all primary segments are determined to be properly operational, the packet of the flow that was received onto switch S2 is then forwarded from switch S2 to switch S8 as determined by flow table 38 of switch S2. The packet is then forwarded on from switch S8 to switch S5 as determined by the flow table of switch S8. When the packet is received at switch S5, the flow entry in the flow table of switch S5 for the flow indicates that the MPLS label is to be removed, and that the resulting unencapsulated IP packet should be sent on to switch S9. The unencapsulated IP packet is therefore sent from switch S5 to its destination IP address in switch S9.

Figure 16:
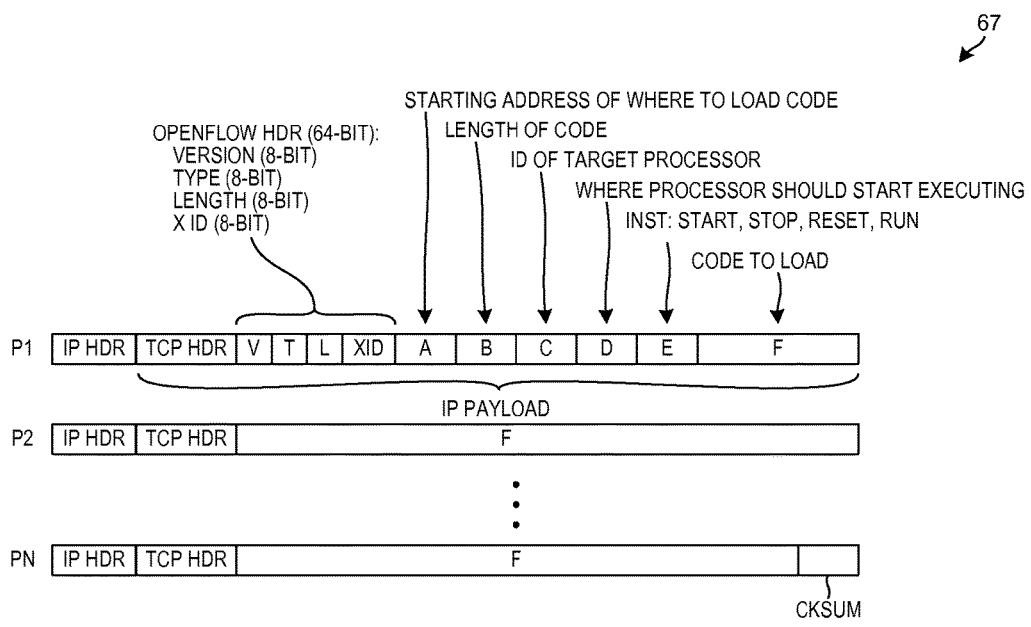
FIG. 16 is a diagram of an OpenFlow plug-and-play boot load message 67.

FIG. 16 is a diagram of an OpenFlow plug-and-play boot load message 67 in accordance with another novel aspect. Some of the MPLS switches of an MPLS network may be manufactured by a first manufacturer and may operate differently and have different features in some respects from other MPLS switches of the MPLS network that are manufactured by a second manufacturer. As new features are added to the MPLS and OAM protocols, or as the MPLS and OAM protocols being supported are upgraded to the next revision, it may be desirable to change low level machine code (sometimes referred to as microcode) executing in different parts of the data path pipeline of the switch so that switch functionality is changed or upgraded. The first entity 2 that operates NOC 20 and the MPLS network 1 typically does not write and does not understand this low level code. Nonetheless, the first entity 2 may need to upgrade the switches. In one example, an OpenFlow plug-and-play boot load message is used to configure an MPLS switch to perform a packet prediction learning algorithm. In a second example, an OpenFlow plug-and-play boot load message is used to configure an MPLS switch to perform a packet prediction operating algorithm. The OpenFlow plug-and-play boot load message can be used to enable packet prediction functionality in various switches within the MPLS network.

In one aspect, the manufacturer of switch S2 of the MPLS network provides updated microcode for execution in various parts of the data path pipeline. FIG. 4 shows the data path pipeline 46 of line card 23 of switch S2 as including an ingress NBI processor 47, a plurality of processors 48 and 49 referred to as MicroEngines (MEs), and an egress NBI processor 50. Intercommunication paths between these parts 47-50 of the data pipeline are not shown in FIG. 4 and the parts 47-50 are only shown in simplified form. For additional details on an ingress NBI (NorthBound Interface), on MEs, and on an egress NBI, see: U.S. patent application Ser. No. 13/399,324, filed Feb. 17, 2012, titled "Configurable Mesh Data Bus In An Island-Based Network Flow Processor", by Gavin J. Stark (the entire subject matter of which is incorporated herein by reference). The ingress and egress NBIs may be hardcoded, but in this example each of the ingress NBI and egress NBI is microcoded. The ingress NBI processor receives and classifies packets including OAM packets. One of the MEs 48 is for processing MPLS data packets, whereas the other ME 49 is for processing OAM packets. The MEs 48 and 49, among many other functions, check flow table 38 and the OAM session tables, and control MPLS label replacement and packet forwarding, and carry out OAM session management, and determine if packets as received from the ingress NBI are well formed. The egress NBI receives packets from the MEs, adds headers, and then outputs the packets to the appropriate output ports. Each of these parts 47-50 is processor-controlled, where the processor executes a program of instructions that controls functionality of the part. Blocks 51-54 in FIG. 4 represent these programs of code. In the novel method, these programs 51-54 of code are replaced in a specified switch by sending the specified switch one or more OpenFlow plug-and-play boot load messages of the form shown in FIG. 16. The OpenFlow message(s) is sent from the NOC to the desired switch and is received onto the switch via an ordinary input port. The IP destination address of the IP packet, however, identifies the switch itself as the destination and is not a destination address to which the switch can forward packets. The IP destination address therefore indicate that the packet is not to be forwarded. Rather, ME 48 in the switch examines the IP payload of the packets of the message and determines that the payload is an OpenFlow message. The channel type field (T) of the OpenFlow header is an 8-bit value. One 8-bit spare value is used to flag the message as the plug-and-play boot load message. The ME 48 therefore determines that the OpenFlow message is the plug-and-play boot load message, and interprets the payload accordingly. The meanings of the various fields A-F of the message are set forth in FIG. 16. A starting address in a memory is identified, and a starting address is indicated where loading is to start, and the code to load is provided. In this way, the OpenFlow message is usable to load new programs of microcode to replace programs 51-54. The manufacturer of the switch provides the second entity 2 (the operator of the MPLS network 1) the OpenFlow messages to use to upgrade the switches in the MPLS network that were made by the manufacturer. The second entity 2 then simply uses the NOC to send these OpenFlow messages to those switches that were manufactured by that switch manufacturer. In a similar way, other switch manufacturers provide the second entity 2 OpenFlow plug-and-play boot load messages to use to upgrade switches they manufactured. Combinations of the OpenFlow messages of FIGS. 13 and 16 are usable both to change the OAM processing code executing in the switches as well as to provision OAM session tables used by that OAM processing code.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    (a) receiving a plurality of packets on a first switch;
    (b) performing a packet prediction learning algorithm using the first plurality of packets and thereby generating packet prediction information, where the packet prediction information includes application protocol estimation information and inter-packet interval prediction information, wherein the inter-packet interval prediction information comprises a plurality of sets of inter-packet interval indicator values, wherein each set corresponds to a corresponding one a plurality of application protocols;

(c) communicating the packet prediction information from the first switch a second switch, wherein the packet prediction information is not communicated to a Network Operation Center (NOC);

(d) communicating a packet prediction information notification from the first switch to the NOC;

(e) in response to (d) the NOC communicates a packet prediction control signal to the second switch; and (f) in response to (e) the second switch utilizes the packet prediction control signal to determine if a packet prediction operation algorithm utilizing the packet prediction information is to be performed, wherein performing the packet prediction operation algorithm includes preloading packet flow data related to a not yet received packet in a memory cache located within the second switch.

2. The method of claim 1, wherein the communicating of (c) is accomplished using an OAM message, and wherein the communicating of (d) and (e) is accomplished using an OpenFlow message.

3. The method of claim 2, wherein the packet prediction information is included in a payload portion of the OAM message.

4. The method of claim 2, wherein the packet prediction control signal is included in a payload portion of an OpenFlow message.

5. The method of claim 1, wherein the plurality of packets are part of a pair of flows, and wherein the plurality of packets belong to the same application protocol.

6. The method of claim 1, wherein when the packet prediction control signal is a first value the second switch performs the packet prediction operation algorithm, and wherein when the packet prediction control signal is a second value the second switch does not perform the packet prediction operation algorithm, wherein the packet prediction control signal is an instruction to the second switch from the NOC.

7. The method of claim 1, wherein a plurality of application protocols for which the second switch performs the packet prediction operation algorithm is a function of the packet prediction control signal.

8. The method of claim 1, further comprising:
(a1) communicating prediction learning algorithm configuration information from the NOC to the first switch, wherein the prediction learning algorithm configuration information configures the prediction learning algorithm characteristics, and wherein the prediction learning algorithm configuration information is communicated in an OpenFlow message.

9. The method of claim 8, wherein the number of packets included in the plurality of packets is a function of the prediction learning algorithm configuration information, and wherein a number of inter-packet intervals generated for an application protocol is a function of the prediction learning algorithm configuration information.

10. A method comprising:
(a) receiving a plurality of packets on a first switch;
(b) performing a packet prediction learning algorithm on the first switch utilizing the first plurality of packets and thereby generating packet prediction information, wherein the packet prediction information includes application protocol estimation information and inter-packet interval prediction information, wherein the inter-packet interval prediction information includes a plurality of sets of inter-packet interval indicators values, and wherein each set of inter-packet interval indicator values corresponds to a different application protocol;

(c) communicating the packet prediction information from the first switch to a second switch, wherein the packet prediction information is not communicated to a Network Operation Center (NOC); and (d) in response to (c) the second switch independently determines if a packet prediction operation algorithm utilizing the packet prediction information is to be performed, wherein performing the packet prediction operation algorithm includes preloading packet flow data related to a not yet received packet in a memory cache located within the second switch.

11. The method of claim 10, wherein the communicating of (c) is accomplished using an OAM message.

12. The method of claim 11, wherein the packet prediction information is included in the payload portion of the OAM message.

13. The method of claim 10, wherein the plurality of packets are part of a pair of flows, and wherein the plurality of packets belong to the same application protocol.

14. The method of claim 10, wherein the second switch performs the packet prediction operation algorithm using the packet prediction information communicated in (c).

15. The method of claim 10, further comprising:
(e) communicating a packet prediction control signal from the NOC to the second switch, wherein a plurality of application protocols for which the second switch performs the packet prediction operation algorithm is determined at least in part by the packet prediction control signal.

16. The method of claim 10, further comprising:
(a1) communicating packet prediction learning algorithm configuration information from the NOC to the first switch, wherein the packet prediction learning algorithm configuration information configures packet prediction learning algorithm characteristics of the packet prediction learning algorithm that is later performed by the first switch in (a), and wherein the packet prediction learning algorithm configuration information is communicated from the NOC to the first switch in (a1) in an OpenFlow message.

17. The method of claim 1, wherein the application protocol estimation information that is generated in (b) comprises a plurality of values, wherein each value indicates an application protocol.

18. The method of claim 1, wherein the application protocol estimation information that is generated in (b) comprises a plurality of values, wherein each value indicates an application protocol, wherein each packet of the plurality of packets received in (a) has a packet state, wherein the plurality of values includes one value for each possible packet state to packet state transition of the transition from each packet of the plurality to the next packet of the plurality.

19. The method of claim 1, wherein the application protocol estimation information that is generated in (b) comprises a plurality of pairs of values, wherein a first value of each pair indicates an application protocol, and wherein a second value of each pair is a probability value.

* * * * *